(12) United States Patent
Smetana

(10) Patent No.: US 9,006,325 B2
(45) Date of Patent: Apr. 14, 2015

(54) POLYMERIC COMPOSITION

(75) Inventor: David A. Smetana, North Canton, OH (US)

(73) Assignee: Suncolor Corporation, North Canton, OH (US)

( * ) Notice: Subject to any disclaimer, the term of this patent is extended or adjusted under 35 U.S.C. 154(b) by 371 days.

(21) Appl. No.: 11/870,459

(22) Filed: Oct. 11, 2007

(65) Prior Publication Data

US 2009/0068363 A1    Mar. 12, 2009

Related U.S. Application Data

(60) Provisional application No. 60/829,158, filed on Oct. 12, 2006, provisional application No. 60/909,948, filed on Apr. 4, 2007.

(51) Int. Cl.
| | |
|---|---|
| *B60C 1/00* | (2006.01) |
| *C08K 3/02* | (2006.01) |
| *C08K 5/00* | (2006.01) |
| *C08K 5/51* | (2006.01) |
| *B82Y 30/00* | (2011.01) |
| *C08J 3/22* | (2006.01) |
| *C08J 5/00* | (2006.01) |
| *C08K 3/22* | (2006.01) |

(52) U.S. Cl.
CPC .............. *C08K 5/0008* (2013.01); *B82Y 30/00* (2013.01); *C08J 3/223* (2013.01); *C08J 5/005* (2013.01); *C08K 3/22* (2013.01); *C08J 2369/00* (2013.01)

(58) Field of Classification Search
USPC ......... 106/400, 403, 404, 408, 410, 411, 412, 106/413, 436, 438, 439, 442, 446, 450, 481, 106/493; 264/328.1; 427/212, 222, 316; 524/80, 430, 437, 439, 492, 493, 497, 524/847, 317, 128, 287, 284, 91; 8/636; 252/602; 527/101

See application file for complete search history.

(56) References Cited

U.S. PATENT DOCUMENTS

| | | | | |
|---|---|---|---|---|
| 3,732,181 | A | * | 5/1973 | Ray et al. .................. 523/207 |
| 5,153,151 | A | | 10/1992 | Aitken |

(Continued)

FOREIGN PATENT DOCUMENTS

| | | |
|---|---|---|
| JP | 2003-73564 | 3/2003 |
| JP | 2006-169347 | 6/2005 |

(Continued)

OTHER PUBLICATIONS

Machine Translation of JP 2005-334006.*

(Continued)

*Primary Examiner* — Ling Choi
*Assistant Examiner* — Thuy-Ai Nguyen
(74) *Attorney, Agent, or Firm* — Renner, Otto, Boisselle & Sklar, LLP

(57) ABSTRACT

The invention relates to a polymeric composition, comprising: at least one thermoplastic resin having a glass transition temperature of at least about 220° C.; inorganic particulates having an average particle size in the range up to about 100 nanometers dispersed in the thermoplastic resin, the inorganic particulates having an index of refraction in the range from about 1.4 to about 3; and an effective amount of at least one dispersant to disperse the inorganic particulates in the thermoplastic resin. The polymer composition may be a high temperature thermoplastic suitable for forming, such as by molding, optical articles such as lenses.

19 Claims, 4 Drawing Sheets

(56) References Cited

U.S. PATENT DOCUMENTS

| | | | |
|---|---|---|---|
| 6,350,792 B1 | 2/2002 | Smetana et al. | 522/81 |
| 6,448,365 B1* | 9/2002 | Funakoshi et al. | 528/196 |
| 6,660,374 B2 | 12/2003 | Smetana et al. | 428/327 |
| 6,667,258 B2 | 12/2003 | Quinn | |
| 2003/0045616 A1* | 3/2003 | Koch et al. | 524/323 |
| 2004/0233526 A1 | 11/2004 | Kaminsky et al. | 359/452 |
| 2006/0094808 A1 | 5/2006 | Kim et al. | 524/430 |
| 2007/0037906 A1* | 2/2007 | Kawato et al. | 524/154 |
| 2009/0060597 A1 | 3/2009 | Yoshida et al. | |

FOREIGN PATENT DOCUMENTS

| | | | |
|---|---|---|---|
| JP | 2005-314661 | 11/2005 | |
| JP | 2005-344005 | 12/2005 | |
| JP | 2005-344006 | 12/2005 | |
| JP | 2005344006 | 12/2005 | |
| JP | 2006169347 | 6/2006 | |
| JP | 2007093893 | 12/2007 | |
| WO | WO 2004078847 A1 * | 9/2004 | C08L 77/00 |
| WO | WO 2005035659 A1 * | 4/2005 | C08K 5/50 |
| WO | 2006/049228 A1 | 11/2006 | |
| WO | 2007/091730 A1 | 8/2007 | |

OTHER PUBLICATIONS

International Search Report and Written Opinion, Application No. PCT/US2007/081021, mailed Mar. 13, 2008.

EP Office Action, Application No. 07 853 933.5, dated Aug. 9, 2012.

Rawle et al.; "Basic Principles of Particle Size Analysis"; Technical Paper; XP55009141A; Malvern Instruments Limited, dated Jan. 2008.

Rudof Riesen et al.; Die Glasubergangtemperatur gemessen mit verschiedenen Ta-Techniken, Teil 2: Ermittlung der Glasubergangstemperaturen, Feb. 2003, pp. 1-20.

Keyes; "Optical Testing and Characterization"; Engineering Plastics, vol. 2, Engineered Materials Handbook, ASM International, 1988, pp. 594-598.

Adachi et al.; "Absorption and scattering of near-infrared light by dispersed lanthanum hexaboride nonoparticles for solar control filters"; J. Mater. Res., vol. 25, No. 3, Mar. 2010, pp. 510-521.

Bowen; "Particle Size Distribution Measurement from Millimeters to Nanometers and from Rods to Platelets"; Journal of Dispersion Science and Technology; vol. 23, No. 5, pp. 631-662, 2002.

N. Stanley-Wood; "Particle Size Analysis Introduction"; Encyclopedia of Analytical Chemistry; 2010, pp. 1-37.

"Characterisation and failure of plastics"; ASM International, 2003, pp. 115-119.

JP Office Action, Application No. 2009-532570, mailed Jun. 26, 2012. English translation.

The Materials Information Society; "Characterization and Failure Analysis of Plastics; adapted from Thermal Analysis and Properties; Engineered Materials Handbook Desk Edition" ASM International, 1995, pp. 367-392.

Penco et al.; "Enthalpy Relaxation in Bisphenol-A Polycarbonate/Poly(methyl methacrylate) Blends"; Polymer Engineering and Science; 2007, pp. 218-224.

EP Office Action, Application No. 07 853 933.5, dated Jul. 5, 2011.

CN Office Action, Application No. 200780045662.9, issued Jul. 6, 2012.

CN Office Action, Application No. 200780045662.9, issued Oct. 14, 2011.

\* cited by examiner

POLYMERIC COMPOSITION

This application claims priority under 35 U.S.C. 35 U.S.C. §119(e) to U.S. Provisional Application Ser. No. 60/829,158, filed Oct. 12, 2006 and to U.S. Provisional Application Ser. No. 60/909,948, filed Apr. 4, 2007. These applications are incorporated herein by reference.

TECHNICAL FIELD

This invention relates to polymeric compositions. More particularly, this invention relates to optical polymeric compositions as well as methods of making such compositions. The invention relates to articles, such as plastic lenses, made from these polymeric compositions.

BACKGROUND

Plastic lenses, glass lenses, and silicone lenses often perform the same function in optical systems, such as in cameras, automotive lighting, military night vision equipment, and, particularly, LEDs (Light Emitting Diodes). The main attributes that separate plastic lenses from glass lenses are lower weight, better impact resistance, and lower cost. Glass, however, is more stable at very high temperatures. The difference in cost is due largely to the difference in manufacturing processes that are required for the two materials and the relative temperatures required to form the materials. Plastic lenses are typically produced at about 230-390° C. using injection molding at cycle times that are about 10 times faster than glass lenses. Glass lenses are typically produced using grinding and polishing or compression molding at about 625° C. Silicone lenses have very high temperature resistance, yet are more expensive to produce than glass. Silicone materials typically cost at least about 3-5 times as much as glass and plastic materials, and require costly molds for either compression molding or liquid injection processing which are performed at relatively slow production rates. It is easier and less expensive to mold special details into plastic lenses than glass and silicone lenses.

Industrial lens devices, such as camera lens and LED lens devices, are typically assembled in solder reflow ovens. Traditionally, lead has been used as an ingredient in the solder to reduce the melting temperature of the solder to just under about 200° C. The problem is that it is often desirable to use lead free solder and the temperature required to melt lead free solder may be about 217° C. or higher. This has led to the requirement of solder reflow ovens that operate at higher temperatures with operating temperatures that typically peak at about 250-285° C. The increase in the processing temperatures for solder reflow ovens has created the need for injection moldable, optically clear thermoplastics that have significantly higher glass transition temperatures (Tg). This invention provides a solution to this problem.

SUMMARY

This invention relates to a polymer composition, comprising: at least one thermoplastic resin having a glass transition temperature of at least about 220° C.; inorganic particulates having an average particle size in the range up to about 100 nanometers (nm) dispersed in the thermoplastic resin, the inorganic particulates having an index of refraction in the range from about 1.4 to about 3; and an effective amount of at least one dispersant to disperse the inorganic particulates in the thermoplastic resin. In one embodiment, the composition further comprises at least one bluing agent. In one embodiment, the composition further comprises at least one ultraviolet light absorber. In one embodiment, the composition further comprises at least one antioxidant. In one embodiment, the composition further comprises one or more heat stabilizers, antistatic agents, pigments, dyes, optical brightners, flame retardants, or a mixture of two or more thereof. In one embodiment, the composition further comprises one or more melt processable glass reinforcing resins or materials.

In one embodiment, the invention relates to an additive composition made by combining: at least one dispersant; inorganic particulates having an average particle size in the range up to about 100 nanometers, the inorganic particulates having an index of refraction in the range from about 1.4 to about 3; at least one dye concentrate comprising (i) at least one dispersant, (ii) at least one bluing agent, and (iii) inorganic particulates having an average particle size in the range up to about 100 nanometers, the inorganic particulates having an index of refraction in the range from about 1.4 to about 3. The additive composition may further comprise one or more antioxidants, UV light stabilizers, heat stabilizers, antistatic agents, pigments, dyes, optical brighteners, flame retardants, or a mixture of two or more.

In one embodiment, the invention relates to a polymer composition comprising at least one thermoplastic resin having a glass transition temperature of at least about 220° C. and the foregoing additive composition.

In one embodiment, the invention relates to a molded article comprising the foregoing polymer composition. The molded article may comprise a lens.

In one embodiment, the invention relates to a method of making a polymer composition, comprising: heating pellets of a thermoplastic resin at a temperature of at least about 70° C., the thermoplastic resin having a glass transition temperature of at least about 220° C.; and coating the pellets with the foregoing additive composition.

In one embodiment, the invention relates to a process of forming an article, comprising: feeding pellets comprising a thermoplastic resin having a glass transition temperature of at least about 220° C. coated with the foregoing additive composition, to an injection molding apparatus and molding the article in the apparatus.

DETAILED DESCRIPTION

Figure 1:
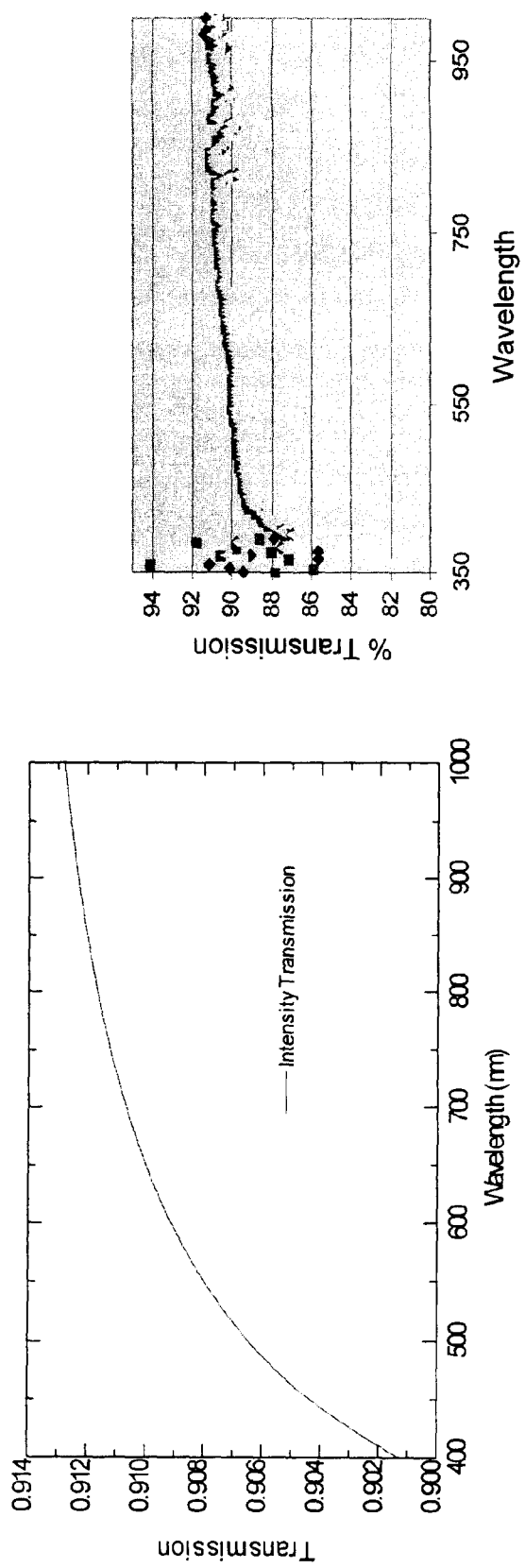
FIG. 1 includes graphs of the theoretical transmission and actual transmission of as-molded, high temperature optical thermoplastic compositions in accordance with an embodiment of the invention as described in Example 1.

All ranges and ratio limits disclosed in the specification may be combined. It is to be understood that unless specifically stated otherwise, references to "a," "an," and/or "the" may include one or more than one and that reference to an item in the singular may also include the item in the plural.

The polymer composition may comprise at least one thermoplastic resin having a glass transition temperature (Tg) of at least about 220° C., and in one embodiment at least about 225° C., and in one embodiment at least about 230° C., and in one embodiment at least about 235° C. The thermoplastic resin may comprise one or more of polycarbonate, polysulfone, polyolefin (e.g., polypropylene), polystyrene, polyalkylene terephthates (e.g., polyethylene terephthalates (PET)), or a mixture of two or more thereof. Copolymers of two or more of the foregoing may be used. The term "copolymer" is used herein to refer to a polymer composition containing two or more different repeating units. The term copolymer is meant to encompass copolymers, terpolymers, and the like.

The polycarbonates may comprise one or more homopolycarbonates, copolycarbonates, thermoplastic polyester-carbonates, or a mixture of two or more thereof. The polycarbonate may comprise at least one bisphenol of the general formula HO—Z—OH, wherein Z is a divalent organic group having from about 6 to about 30 carbon atoms and one or more aromatic groups. The bisphenol may comprise one or more dihydroxydiphenyls, bis(hydroxyphenyl)alkanes, indanebisphenols, bis(hydroxy-phenyl)ethers, bis(hydroxyphenyl)sulfones, bis(hydroxyphenyl)ketones, α,α'-bis(hydroxyphenyl)-diisopropylbenzenes, and the like. Examples of bisphenols that may be used may include para, para' isopropylidene diphenol (bisphenol A), tetraalkylbisphenol A, 4,4-(meta-phenylenediisopropyl)-diphenol (bisphenol M), 4,4-(para-phenylenediisopropyl)-diphenol, 1,1-bis-(4-hydroxyphenyl)-3,3,5-trimethylcyclohexane (bisphenol TMC), or a mixture of two or more thereof. The polycarbonate may comprise a homopolycarbonate based on monomers of bisphenol A. The polycarbonate may comprise a copolycarbonate based on monomers of bisphenol A and bisphenol TMC. The bisphenol may be reacted with one or more carbonic acid compounds, for example, phosgene, diphenyl carbonate or dimethyl carbonate.

The polycarbonate may comprise a mixture of two or more polycarbonates. For example, the polycarbonate may comprise a mixture of a polycarbonate made from bisphenol A and a polycarbonate made from bisphenol TMC.

Polyester-carbonates may be obtained by reaction of one or more of the foregoing bisphenols with one or more aromatic dicarboxylic acids and optionally one or more carbonic acid equivalents. The aromatic dicarboxylic acids may include, for example, orthophthalic acid, terephthalic acid, isophthalic acid, 3,3'- or 4,4'-diphenyldicarboxylic acid, one or more benzophenonedicarboxylic acids, or a mixture of two or more thereof. Up to about 80 mol %, and in one embodiment from about 20 to about 50 mol %, of the carbonate groups in the polycarbonate may be replaced by aromatic dicarboxylic acid ester groups.

Inert organic solvents may be used in the reaction to form the polycarbonate. These may include methylene chloride, dichloroethane, chloropropane, carbon tetrachloride, chloroform, chlorobenzene, chlorotoluene, or a mixture of two or more thereof.

The reaction to form the polycarbonate may be accelerated by catalysts, such as tertiary amines, N-alkylpiperidines, onium salts, or a mixture of two or more thereof. Tributylamine, triethylamine and/or N-ethylpiperidine may be used.

The polycarbonate may be branched deliberately and in a controlled manner by the use of small amounts of branching agents. Suitable branching agents may include, for example, phloroglucinol; 4,6-dimethyl-2,4,6-tri-(4-hydroxyphenyl)-hept-2-ene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-4-hydroxyphenyl)-cyclohexyl]propane; 2,4-bis-(4-hydroxyphenyl-isopropyl)-phenol; 2,6-bis-(2-hydroxy-5'-methyl-benzyl)-4-methylphenol; 2-(4-hydroxyphenyl)-2-(2,4-dihydroxyphenyl)-propane; hexa-(4-(4-hydroxyphenyl-isopropyl)-phenyl)-orthoterephthalic acid ester, tetra-(4-hydroxyphenyl)-methane; tetra-(4-(4-hydroxyphenyl-isopropyl)-phenoxy)-methane; α, α', α"-tris-hydroxyphenyl-1,3,5-triisopropylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4"-dihydroxytriphenyl)-methyl)benzene; 1,1,1-tri-(4-hydroxyphenyl)-ethane and/or 3,3-bis-(3-methyl-4-hydroxyphenyl)-2-oxo-2,3-dihydroindole.

One or more chain stoppers may be used in the reaction to form the polycarbonate. The chain stopper may comprise one or more phenols, such as phenol, alkylphenols, such as cresol or 4-tert-butylphenol, chlorophenol, bromophenol, cumylphenol, or mixtures of two or more thereof.

The polycarbonate may be referred to as being an injection moldable, optically clear thermoplastic with a high glass transition temperature (Tg). The polycarbonate may have a Tg of at least about 200° C., and in one embodiment from about 200 to about 235° C., or higher. The Tg may be at least about 220° C., and in one embodiment at least about 227° C., and in one embodiment at least about 235° C. The Tg may be in the range from about 220 to about 290° C., and in one embodiment from about 220° C. to about 260° C., and in one embodiment from about 235° C. to about 290° C., and in one embodiment from about 235° C. to about 260° C.

The polycarbonate may have a weight average molecular weight ($M_w$) in the range from about 20,000 to about 40,000, and in one embodiment in the range from about 26,000 to about 36,000, and in one embodiment in the range from about 28,000 to about 35,000, and in one embodiment from about 31,000 to about 35,000, and in one embodiment about 33,000, as determined by measuring the relative solution viscosity of the polycarbonate in methylene chloride or in a mixture of equal amounts by weight of phenol/-o-dichlorobenzene, calibrated by light scattering.

The polycarbonate may be produced by the synthesis of bisphenol A with bisphenol TMC. Alternatively, a mixture of a polycarbonate made from bisphenol A and a polycarbonate made from bisphenol TMC may be used. The polycarbonate may have a Vicat Softening Temperature in the range of from about 225° C. to about 235° C., and a Tg greater than about 227° C. Polycarbonates available from Bayer under the trade designation APEC® TP 0277 may be used.

The concentration of the thermoplastic resin in the polymer composition may be at least about 15% by weight, and in one embodiment at least about 50% by weight, and in one embodiment at least about 75% by weight, and in one embodiment at least about 90% by weight, and in one embodiment at least about 95% by weight, and in one embodiment at least about 97.3% by weight, and in one embodiment in the range from about 15 to about 99.8% by weight based on the total weight of the polymer composition, and in one embodiment from about 50 to about 99.8% by weight, and in one embodiment from about 75 to about 99.8% by weight, and in one embodiment from about 90 to about 99.8% by weight, and in one embodiment from about 95 to about 99.8% by weight, and in one embodiment from about 97.3 to about 99.75% by weight.

The inorganic particulates may be referred to as nanomaterials, for example, transparent nanomaterials and/or as high temperature resistant nanomaterials. These particulates may be used to enhance the dispersion of visible light in molded articles made from the polymer composition. As such, these particulates may contribute to providing optically clear molded articles made from the polymer composition. These particulates may also serve as a dispersant aid, suspension aid, and/or flow aid for the thermoplastic resin. The inorganic particulates may comprise aluminum oxide, silicon dioxide, silicon, cerium oxide, titanium dioxide, zirconium oxide, or a mixture of two or more thereof. The average particle size of the inorganic particulates may be in the range up to about 100 nm, and in one embodiment in the range from about 1 to about 100 nm, and in one embodiment in the range from about 1 to about 75 nm, and in one embodiment in the range from about 1 to about 50 nm, and in one embodiment in the range from about 3 to about 50 nm, and in one embodiment from about 5 to about 50 nm, and in one embodiment from about 5 to about 40 nm, and in one embodiment from about 5 to about 30 nm, and in one embodiment from about 5 to about 20 nm, and in one embodiment from about 5 to about 15 nm. The inorganic particulates may have a refractive index in the range from about 1.4 to about 3, and in one embodiment in the range from about 1.4 to about 2.5, and in one embodiment in the range from about 1.4 to about 2, and in one embodiment in the range from about 1.4 to about 1.8, and in one embodiment in the range from about 1.5 to about 1.6. The refractive index may be in the range from about 1.42 to about 3, and in one embodiment in the range from about 1.42 to about 2.5, and in one embodiment in the range from about 1.42 to about 2, and in one embodiment in the range from about 1.52 to about 1.58, and in one embodiment in the range from about 1.54 to about 1.58, and in one embodiment about 1.56. The inorganic particulates may have a relatively high zeta potential. The zeta potential may be at least about +30 mV or more negative than −30 mV, and in one embodiment at least about +35 mV or more negative than −35 mV. The inorganic particulates may be thermally stable at temperatures up to about 350° C., in one embodiment up to about 400° C., and in one embodiment up to about 600° C., and in one embodiment up to about 800° C., and in one embodiment up to about 1000° C. or higher. Examples of inorganic particulates that may be used may include Aluminum Oxide C and/or Aeroxide Alu US available from Degussa Corporation.

The inorganic particulates may be silane treated to enhance dispersion of the inorganic particulates into the polymer and to optionally couple the inorganic particulates to the polymer resin system. Examples of silanes that may be used may include Dynasylan OCTEO (octyltriethoxysilane), Dynasylan DAMO (N-2-aminoethyl-3-aminopropyltrimethoxysilane) and Dynasylan 9165 (phenyltrimethoxysilane). Blends of Dynasylan DAMO and Dynasylan 9165 may be used. These may be thermally stable at temperatures up to about 370° C. or higher and are available from Degussa Corporation.

The inorganic particulates may be surface treated with one or more titanates, one or more zirconates, or a mixture thereof. The titanates and zirconates may comprise one or more organometallic complexes of titanium or zirconium complexed by one or more organic compounds containing functional groups attached to a hydrocarbon linkage. The organic compounds may contain one or more, and in one embodiment, two or more functional groups. The functional groups may comprise one or more of =O, =S, —OR, —SR, —NR$_2$, —NO$_2$, =NOR, =NSR and/or —N=NR, wherein R is hydrogen or a hydrocarbon group (e.g., alkyl or alkenyl) of 1 to about 10 carbon atoms. The titanates and zirconates may include alkoxy titanates and coordinate zirconates. These may include the alkoxy titanates available under the tradenames LICA 12 or KR-PRO, from Kenrich Petrochemicals, Inc., Bayonne, N.J., and the coordinate zirconates available under the tradenames KZ 55 or KR 55, from Kenrich.

The concentration of the inorganic particulates in the polymer composition may be in the range up to about 30% by weight, and in one embodiment in the range from about 0.0001 to about 30% by weight, and in one embodiment in the range from about 0.0001 to about 25% by weight, and in one embodiment from about 0.0001 to about 20% by weight, and in one embodiment from about 0.0001 to about 10% by weight, and in one embodiment in the range from about 0.001 to about 5% by weight, and in one embodiment from about 0.01 to about 2% by weight, and in one embodiment from about 0.01 to about 1% by weight, based on the total weight of the polymer composition. The concentration of the inorganic particulates in the additive composition that may be used in making the polymer composition may be in the range from about 0.5 to about 20% by weight based on the total weight of the additive composition, and in one embodiment from about 1 to about 10% by weight.

The dispersant may comprise any material that enhances the dispersion of the inorganic particulates in the thermoplastic resin. The dispersant may comprise one or more fatty acids, fatty esters, fatty amides, fatty alcohols, or a mixture of two or more thereof. The fatty acids may comprise one or more saturated and/or unsaturated monocarboxylic acids of about 10 to about 36 carbon atoms, and in one embodiment from about 14 to about 26 carbon atoms, and in one embodiment about 12 to about 22 carbon atoms. The saturated monocarboxylic acids may comprise one or more of myristic acid, palmitic acid, stearic acid, arachidic acid, behenic acid, and/or hexatrieisocontanoic acid. The unsaturated monocarboxylic acids may comprise one or more of palmitoleic acid, oleic acid, linoleic acid, linolenic acid and/or cetoleic acid. Mixtures of two or more of the foregoing acids may be used.

The fatty esters may comprise one or more esters of one or more of the foregoing carboxylic acids and one or more alcohols. The alcohol may comprise one or more monohydric alcohols and/or one or more polyhydric alcohols. The monohydric alcohols may include alcohols of 1 to about 5 carbon atoms such as methyl alcohol, ethyl alcohol, propyl alcohol, butyl alcohol, pentyl alcohol, or a mixture of two or more thereof. The polyhydric alcohols may include glycerol, erythritol, pentaerythritol, dipentaerythritol, gluconic acid, glyceraldehyde, glucose, arabinose, 1,7-heptanediol, 2-4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis-(hydroxymethyl) cyclohexanol, 1,10-decanediol, digitalose, or a mixture of two or more thereof. Examples of the esters that may be used may include methylstearate, butylstearate, ethyloleate, butyl-linoleate, glycerol monolaurate, glycerol monooleate, glycerol monoricinoleate, glycerol monostearate, glycerol distearate, glycerol tristearate, pentaerythritol tetrastearate, or a mixture of two or more thereof. The fatty ester may comprise one or more saturated fatty esters, one or more unsaturated fatty esters, or a mixture thereof. The fatty ester may comprise a solid material at room temperature, for example, a dry powder.

The fatty amides may comprise one or more amides of one or more of the foregoing carboxylic acids and ammonia and/or at least one amine. The amine may comprise one or more monoamines, one or more polyamines, one or more hydroxyamines and/or one or more alkoxylated amines. The monoamines may include methylamine, ethylamine, diethylamine, n-butylamine, di-n-butylamine, allylamine, isobutylamine, cocoamine, stearylamine, laurylamine, methyllaurylamine, oleylamine, N-methyl-octylamine, dodecylamine, octadecylamine, or a mixture of two or more thereof. The polyamies may include the alkylene polyamines such as ethylene diamine, diethylene, triamine, triethylene tetramine, tetraethylene pentamine, pentaethylene hexamine, propylene diamine, trimethylene diamine, hexamethylene diamine, decamethylene diamine, octamethylene diamene, di(heptamethylene)triamine, tripropylene tetramine, di(trimethylene) triamine, N-(2-aminoethyl) peperazine, or a mixture of two or more thereof. The hydroxyamines may comprise one or more primary alkanol amines, one or more secondary alkanol amines, or a mixture thereof. The hydroxyamines may be referred to as aminoalcohols. Examples may include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propanediol, 2-amino-2-ethyl-1,3-propanediol, N-(beta-hydroxypropyl)-N'-(beta-aminoethyl)-piperazine, tris(hydroxymethyl)amino methane, 2-amino-1-butanol, ethanolamine, beta-(beta-hydroxyethoxy)-ethyl amine, glucamine, glusoamine, N-3-(aminopropyl)-4-(2-hydroxyethyl)-piperadine, 2-amino-6-methyl-6-heptanol, 5-amino-1-pentanol, N-(beta-hydroxyethyl)-1,3-diamino propane, 1,3-diamino-2-hydroxypropane, N-(beta-hydroxy ethoxyethyl)-ethylenediamine, trismethylolaminomethane, or a mixture of two or more thereof. The alkoxylated amines may include the alkoxylated alkylene polyamines such as N,N(diethanol) ethylenediamine, N-(2-hydroxyethyl) ethylene diamine, N,N-bis(2-hydroxyethyl)-ethylene-diamine, 1-(2-hydroxyethyl) piperazine, mono(hydroxypropyl)-substituted diethylene triamine, di(hydroxypropyl)-substituted tetraethylene pentamine, N-(3-hydroxybutyl)-tetramethylene diamine, or a mixture of two or more thereof.

The fatty amide may comprise stearamide, oleamide, linoleamide, linolenamide, or a mixture of two or more thereof. The fatty amide may comprise one or more alkylenebisfattyamides, such as ethylenebistearamide, ethylenebisoleamide, ethylenebislinoleamide, or a mixture of two or more thereof.

The fatty alcohols may comprise one or more saturated fatty alcohols, one or more unsaturated fatty alcohols, or a mixture thereof. The saturated fatty alcohols may include octyl alcohol, decylalcohol, lauryl alcohol, myristyl alcohol, cetyl alcohol, stearyl alcohol, or a mixture of two or more thereof. The unsaturated fatty alcohols may include oleyl alcohol, linoleyl alcohol, linolenyl alcohol, or a mixture of two or more thereof.

The dispersant may comprise one or more polyalkylene glycols, polyoxyalkylene glycols, or a mixture thereof. Examples may include diethylene glycol, triethylene glycol, tetraethylene glycol, dipropylene glycol, tripropylene glycol, dibutylene glycol, tributylene glycol, as well as other alkylene glycols and polyoxyalkylene glycols in which the alkylene groups contain from 2 to about 8 carbon atoms. Mixtures of two or more of the foregoing may be used.

The dispersant may comprise one or more titanates, one or more zirconates, or a mixture thereof. The titanates and zirconates may comprise one or more organometallic complexes of titanium or zirconium complexed by one or more organic compounds containing functional groups attached to a hydrocarbon linkage. The organic compounds may contain one or more, and in one embodiment, two or more functional groups. The functional groups may comprise one or more of =O, =S, —OR, —SR, —NR$_2$, —NO$_2$, =NOR, =NSR and/or —N=NR, wherein R is hydrogen or a hydrocarbon group (e.g., alkyl or alkenyl of 1 to about 10 carbon atoms). The titanates and zirconates may include alkoxy titanates and coordinate zirconates. These may include the alkoxy titanates available under the tradenames LICA 12 or KR-PRO, from Kenrich Petrochemicals, Inc., Bayonne, N.J., and the coordinate zirconates available under the tradenames KZ 55 or KR 55, from Kenrich. These may be provided in liquid or powder form. The powder may be formed by sorbing liquid titanate or zirconate on inorganic particulates, such as fumed silica or aluminum oxide. For example, a titanate or zirconate powder may be prepared by drip blending two parts titanate or zirconate liquid on one part aluminum oxide particulates. The titanates may be thermally stable to 350° C. and the zirconates may be thermally stable to 400° C. The zirconates may be used with a phenol antioxidant, thermal stabilizer.

The dispersant may comprise one or more hydrocarbon dispersants, including natural or synthetic paraffins, polyethylene waxes, or mixtures of two or more thereof. The dispersant may comprise one or more fluorocarbons. The dispersant may comprise one or more silicone release agents such as one or more silicone oils.

The dispersant may comprise one or more surfactants. These may include ionic and/or non-ionic surfactants. The ionic surfactants may be cationic and/or anionic compounds. These compounds may have a hydrophilic lipophilic balance (HLB) up to about 20, and in one embodiment in the range from about 1 to about 20. The surfactants that may be used may include those disclosed in *McCutcheon's Emulsifiers and Detergents,* 1993, North American & International Edition. Examples may include alkanolamides, alkylarylsulphonates, amine oxides, poly(oxyalkylene) compounds, including block copolymers comprising alkylene oxide repeat units, carboxylated alcohol ethoxylates, ethoxylated alcohols, ethoxylated alkyl phenols, ethoxylated amines and amides, ethoxylated fatty acids, ethoxylated fatty esters and oils, fatty esters, glycerol esters, glycol esters, imidazoline derivatives, lecithin and derivatives, lignin and derivatives, monoglycerides and derivatives, olefin sulphonates, phosphate esters and derivatives, propoxylated and ethoxylated fatty acids or alcohols or alkyl phenols, sorbitan derivatives, sucrose esters and derivatives, sulphates or alcohols or ethoxylated alcohols or fatty esters, polyisobutylene succinicimide and derivatives, sulphonates of dodecyl and tridecyl benzenes or condensed naphthalenes or petroleum, sulphosuccinates and derivatives, tridecyl and dodecyl benzene sulphonic acids, and mixtures of two or more thereof.

The dispersant may also function as an internal lubricant, mold release and/or processing aid. The dispersant may function as a dispersant for other additive materials in addition to the inorganic particulates. The dispersant may be hydrophobic. The dispersant may have a melt temperature in the range from about 50 to about 200° C., and in one embodiment from about 60 to about 170° C., and in one embodiment about 65° C. The dispersant may be thermally stable at a temperature up to about 350° C., and in one embodiment up to about 400° C. or higher.

The dispersant may include INT-40DHT, which is a product that may be available from Axel Plastics Research Laboratories, Inc., Woodsie, N.Y. INT-40DHT. The product may be thermally stable up to about 400° C. INT-40DHT may be identified as a mixture of saturated and unsaturated fatty esters with modified organic derivatives. INT-40 DHT may be identified as a mixture of one or more fatty acids, fatty esters and glycerides.

The dispersant may be INT-33UDY or INT-33UDS from Axel Plastics. These may be identified as a mixture of one or more fatty amides and one or more surfactants. INT 33UDY may be thermally stable up to about 350° C., and INT-33UDS may be stable up to about 400° C.

The bluing agent may be used to enhance the color quality of molded articles made from the polymer composition. The bluing agent may be used to offset yellow color formation in the polymer composition so as to optically clarify the polymer composition. The bluing agent may comprise at least one blue dye, or a mixture of at least one blue dye and at least one violet dye. The blue dye may be Amplast Blue R3 or Amplast Blue HB, which may be available from ColorChem International Corp. and are identified as being insoluble blue dyes in the form of a dry powder that melts at about 170° C. and is thermally stable at temperatures up to about 400° C. The violet dye may be Amplast Violet BV or Amplast Violet PK which may be available from ColorChem International Corp. and are identified as being unsoluble violet dyes in the form of dry powders that melt at about 170° C. and are thermally stable at temperatures up to about 400° C. The concentration of the bluing agent in the polymer composition may be in the range from about 0.05 to about 4 parts per million based on the weight of the polymer composition. The concentration of the bluing agent in the additive composition that may be used in making the polymer composition may be in the range from about 0.0005 to about 0.008% by weight based on the total weight of the additive composition, and in one embodiment from about 0.001 to about 0.004% by weight.

The bluing agent may be provided in the form of a dye concentrate which may comprise (i) at least one dispersant; (ii) at least one dye, and (iii) inorganic particulates having an average particle size in the range up to about 100 nm and an index of refraction in the range from about 1.4 to about 2.5. The dispersant, dye and inorganic particulates may be the same as described above. The specific dispersant and/or inorganic particulates in the dye concentrate may be the same, or either or both may be different than the specific dispersant and inorganic particulates supplied to the polymer composition separately from the dye concentrate. As indicated above, the dye may be a blue dye, or a mixture of blue and violet dyes. The concentration of dispersant in the dye concentrate may be in the range from about 98.5 to about 99.8% by weight, and in one embodiment from about 99.0 to about 99.6% by weight. The concentration of the dye in the dye concentrate may be in the range from about 0.05 to about 0.8% by weight, and in one embodiment from about 0.2 to about 0.6% by weight. The concentration of the inorganic particles in the dye concentrate may be in the range from about 0.05 to about 1% by weight, and in one embodiment from about 0.1 to about 0.5% by weight. The dye concentrate may be in the form of a dry powder which may be thermally stable up to at least about 350° C., and in one embodiment up to at least about 400° C. The concentration of the dye concentrate in the polymer composition may be in the range from about 0.001 to about 0.01% by weight based on the total weight of the polymer composition, and in one embodiment from about 0.004 to about 0.008% by weight. The concentration of the dye concentrate in the additive composition that may be used in making the polymer composition may be in the range from about 0.5 to about 6% by weight based on the total weight of the additive composition, and in one embodiment from about 1 to about 4% by weight.

The dye concentrate may be made by mixing and optionally grinding the materials selected for use in the dye concentrate. An example of a dye concentrate which may be a homogenous, free-flowing, dry powder is shown in Table 1.

TABLE 1

| Material: | % by Weight of Total Dye Concentrate Formula: |
|---|---|
| (1) mixture of saturated and unsaturated fatty esters; or (2) mixture of organic fatty amides with surfactants; or a mixture of (1) and (2) | 98.4-99.7 |
| High temperature stable blue dye/dry powder | 0.05-0.3 |
| High temperature stable violet dye/dry powder | 0.05-0.3 |
| Inorganic particulate solids with average particle size <100 nm. | 0.05-1.0 |

In one embodiment, the dye concentrate may have a formula set forth in Table 2.

TABLE 2

| Material: | % by Weight of Total Dye Concentrate Formula: |
|---|---|
| (1) Mixture of saturated and unsaturated fatty esters; or (2) mixture of organic fatty amides with surfactants; or a mixture of both (1) and (2) | 99.4 |
| High temperature stable blue dye/dry powder | 0.2 |
| High temperature stable violet dye/dry powder | 0.2 |
| Inorganic particulates with average particle size <100 nm | 0.2 |

The dye concentrate may be made in the form of a homogenous paste. An example of a homogenous paste concentrate is shown in Table 3.

TABLE 3

| Material: | % by Weight of Total Dye Concentrate Formula: |
|---|---|
| Titanate or zirconate liquid | 98.4-99.7 |
| High temperature stable blue dye/dry powder | 0.05-0.3 |
| High temperature stable violet dye/dry powder | 0.05-0.3 |
| Inorganic particulate solids with average particle size <100 nm. | 0.1-1.0 |

In one embodiment, the dye concentrate may have the formula set forth in Table 4.

TABLE 4

| Material: | % by Weight of Total Dye Concentrate Formula: |
|---|---|
| Titanate or zirconate liquid | 99.4 |
| High temperature stable blue dye/dry powder | 0.2 |
| High temperature stable violet dye/dry powder | 0.2 |
| Inorganic particulates with average particle size <100 nm | 0.2 |

The ultraviolet (UV) light absorber may be used to provide hydrolytic and/or thermal stability to the polymer composition and/or long term hydrolytic, photolytic, and/or thermal stability to articles molded from the polymer composition. The UV light absorber may be referred to as a UV light stabilizer. The UV light absorber may be may be thermally stable up to a temperature of about 350° C., and in one embodiment up to about 400° C. or higher. In one embodiment the UV absorber may be thermally stable up to at least about 400° C. when combined with the fatty ester and inorganic particulates described above. Materials suitable for use as the UV light absorber may include tetraethyl 2,2' (1,4-phenylenedimethylidyne)bis malonate. A suitable material may be Hostavin® B-CAP which is available from Clariant Corporation, Charlotte, N.C. The UV absorber may comprise one or more substituted triazines, such as 2,4-bis(2,4-dimethylphenyl)-6-(2-hydroxy-4-n-octyloxyphenyl)-1,3,5-triazine (CYA-SORB® UV-1164) or 2-(4,6-diphenyl-1,3,5-triazin-2-yl)-5-(hexyl)oxyphenol (Tinuvin® 1577). The UV absorber may comprise 2,2-methylenebis-(4-(1,1,3,3-tetramethylbutyl)-6-(2H-benzotriazol-2-yl)phenol). The UV absorber may comprise one or more benzophenone compounds such as 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydride benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophenone and/or 2-hydroxy-4-methoxy-2'-carboxybenzophenone. The UV absorber may comprise one or more benzotriazole compounds such as 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzooxazin-4-one) and/or 2-[2-hydroxy-3-(3,4,5,6-tetrahydrophthalimidomethyl)-5-methylphenyl]benzotriazole. The concentration of the UV light absorber in the polymer composition may be in the range from about 0.01 to about 0.2% by weight based on the total weight of the polymer composition, and in one embodiment from about 0.02 to about 0.1% by weight. The concentration of the UV light absorber in the additive composition that may be used in making the polymer composition may be in the range from about 3 to about 20% by weight based on the total weight of the additive composition, and in one embodiment from about 4 to about 10% by weight.

The antioxidant may comprise a high molecular weight, low volatility primary antioxidant and/or a high molecular weight, low volatility secondary antioxidant. The antioxidant may be suitable for substantially reducing or eliminating yellowing of the thermoplastic resin during processing. The primary antioxidant may be thermally stable up to about 350° C., and in one embodiment up to about 400° C. or greater. In one embodiment the primary antioxidant may be thermally stable up to about 400° C. or greater when combined with the fatty ester and inorganic particulates described above. The primary antioxidant may have a molecular weight in the range from about 550 to about 750.

The primary antioxidant may comprise one or more hindered phenols. These may include one or more of 1,3,5-tris (4-t-butyl-3-hydroxy-2,6-dimethylbenzyl) s-triazine-2,4,6-(1H,3H,5H)-trione; 4,4'-isopropylidene-diphenol; butylated hydroxyanisole; 1,3,5-trimethyl-2,4,6-tris(3,5-di-di-tert-butyl-4-hydroxybenzyl)benzene; 4,4'-methylene-bis(2,6-di-tert-butylphenol); 1,1,3-tris(2-methyl-4-hydroxy-5-tert-butylphenyl)butane; 2,6-di-tert-butyl-4-ethylphenol; bis-[3,3-bis-(4'-hydroxy-3'-tert-butyl-phenyl-butanoic acid]-glycol ester; 1,1,3-tris(2-methyl-4-hydroxy-5-tert-butyl-phenyl)butane; 4,4'-thio-bis(6-tert-butyl-m-cresol); 4,4-thio-bis(2-tert-butyl-m-cresol); 4,4'-butylidene-bis(2-tert-butyl-m-cresol); 2,6-di-tert-butyl-p-cresol; 2,6-di-tert-butyl-4-sec-butylphenol; 2,2'-methylene-bis(4-ethyl-6-tert-butylphenol); 1,3,5-(4-tert-butyl-3-hydroxy-2,6-dimethylbenzyl)-1,3,5-triazine-2,4,6-(1H,3H,5G)-trione; 2,2'-methylene-bis(4-methyl-6-tert-butylphenol); 1,6-hexamethylene-bis(3,5-di-tert-butyl-4-hydroxyhydrocinnamate); tetrakis {methylene-3-(3,5-di-tert-butyl-4-hydroxyphenyl)propionate}methane; octadecyl-3-(3'5-di-tert-butyl-4-hydroxyphenyl)propionate; 1,3,5-tris(3,5-di-tert-butyl-4-hydroxybenzyl)isocyanurate; 3,5-di-tert-butyl-4-hydroxyhydrocinnamic acid trimester, or mixtures of two or more thereof. A hindered phenol that may be used may be 1,3,5-tris(2-hydroxyethyl)-s-triazine-2,4,6-(1H,3H,5H)trione which may be available as Cyanox® 1790 from Cytec Industries, West Paterson, N.J.

The concentration of the primary antioxidant in the polymer composition may be in the range up to about 1% by weight, and in one embodiment from about 0.01 to about 1% by weight based on the total weight of the polymer composition, and in one embodiment from about 0.03 to about 0.07% by weight. The concentration of the primary antioxidant in the additive composition that may be used in making the polymer composition may be in the range up to about 10% by weight, and in one embodiment from about 1 to about 10% by weight based on the total weight of the additive composition, and in one embodiment from about 3 to about 7% by weight.

The secondary antioxidant may be used to reduce yellowing of the polymer composition during high temperature processing. The secondary antioxidant may also provide hydrolytic and/or thermal stability to the polymer composition during processing. The secondary antioxidant may provide long term hydrolytic, photolytic, and/or thermal stability to molded articles formed from the polymer composition. The secondary antioxidant may be thermally stable up to a temperature of at least about 350° C., and in one embodiment up to at least about 400° C. In one embodiment, the secondary antioxidant may be thermally stable up to at least about 400° C. when combined with at least one fatty ester and inorganic particulates as discussed above.

The secondary antioxidant may comprise at least one phosphite. The secondary antioxidant may comprise one or more of bis(aralkylphenyl) pentaerythritol diphosphite, bis(2,4-dicumylphenyl)pentaerythritol diphosphite, distearylpentaerythritol diphosphite, dioctylpentaerythritol diphosphite, diphenylpentaerythritol diphosphite, bis(2,4-di-tert-butylphenyl)pentaerythritol diphosphite, bis(2,6-di-tert-butyl-4-methylphenyl)pentaerythritol diphosphite, dicyclohexylpentaerythritol diphosphite, or a mixture of two or more thereof.

A useful secondary antioxidant may be bis(2,4-dicumylphenyl)pentaerythritol diphosphite available as Doverphos® S-9228PC from Dover Chemical Corporation, Dover, Ohio. Doverphos S-9228PC may be advantageous for use with polycarbonates due to the fact it has a maximum sodium content of about 200 parts per million, which may be effective for enhancing optical clarity and/or avoiding leaching of sodium from the molded article. This material may have a melting point of about 220° C. or higher. This material exhibits good hydrolytic stability, and may be thermally stable at temperatures up to about 400° C.

The concentration of the secondary antioxidant in the polymer composition may be in the range up to about 0.4% by weight, and in one embodiment from about 0.01 to about 0.4% by weight based on the total weight of the polymer composition, and in one embodiment from about 0.05 to about 0.25% by weight. The concentration of the secondary antioxidant in the additive composition that may be used in making the polymer composition may be in the range up to about 50% by weight, and in one embodiment from about 3 to about 50% by weight based on the total weight of the additive composition, and in one embodiment from about 10 to about 40% by weight.

The antistatic agent may comprise one or more of polyetherestearmide, glycerin monostearate, dodecylbenzenesulfonic acid ammonium salt, dodecylbenzesulfonic acid phosphonium salt, maleic anhydride monoglyceride, maleic anhydride diglyceride, carbon, graphite and/or a metal powder. The concentration of the antistatic agent in the polymer composition may be in the range from about 0.02 to about 1% by weight based on the total weight of the polymer composition, and in one embodiment from about 0.05 to about 0.5% by weight. The concentration of the antistatic agent in the additive composition that may be used in making the polymer composition may be in the range from about 0.05 to about 20% by weight based on the total weight of the additive composition, and in one embodiment from about 1 to about 10% by weight.

The heat stabilizer may comprise one or more of phosphorous acid, phosphoric acid, esters of these, and/or condensates of these. Examples of these may include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate and/or triphosphoric acid. These compounds may be used alone or in combination of two or more. The concentration of the heat stabilizer in the polymer composition may be in the range up to about 0.5% by weight based on the total weight of the polymer composition, and in one embodiment from about 0.001 to about 0.5% by weight. The concentration of the heat stabilizer in the additive composition that may be used in making the polymer composition may be in the range up to about 30% by weight based on the total weight of the additive composition, and in one embodiment from about 3 to about 30% by weight.

The polymer composition may further comprise one or more melt processable glass reinforcing resins or materials. The melt processable glass reinforcing resin may comprise at least one phosphate glass. The melt processable glass reinforcing resin may have a Tg in the range from about 220° C. to about 400° C. The melt processable glass reinforcing resin may be present in the polymer composition at a concentration in the range up to about 90% by weight based on the weight of the polymer composition, and in one embodiment from about 0.25 to about 90% by weight, and in one embodiment from about 10 to about 50% by weight. The melt processable glass reinforcing resin may be present in the polymer composition at a concentration in the range up to about 40% by volume based on the volume of the polymer composition, and in one embodiment from about 0.1 to about 40% by volume, and in one embodiment from about 4.5 to about 25% by volume.

Without being bound to any particular theory, the melt processable glass reinforcing resin may provide the polymer composition with a higher Tg than the Tg of the polymer composition without the glass reinforcing resin. The melt processable glass reinforcing resin may increase the temperature resistance, stiffness and/or modulus of the polymer composition. The glass reinforcing resin may reduce the shrinkage of the polymer composition upon cooling in the mold. The glass reinforcing resin may make the molded articles formed from the polymer composition more abrasion resistant. A suitable melt processable glass reinforcing resin is 908YRL, which is a phosphate glass available from Corning. This material may have a Tg of about 309° C. and a refractive index of about 1.55-1.57. Other phosphate glasses that may be useful are described in U.S. Pat. No. 6,667,258 B2 and U.S. Pat. No. 5,153,151, which are incorporated herein by reference for their disclosures of phosphate glasses. While it may be desirable to match, as closely as possible, the refractive indexes of the polymer and the phosphate glass, it may also be desirable to use a phosphate glass having a higher refractive index than that of the polymer composition in order to increase the overall refractive index of the polymer composition.

The glass reinforcing resin may be silane treated to enhance dispersion of the glass reinforcing resin into the polymer and to optionally couple the glass reinforcing resin to the polymer resin system. Examples of silanes that may be used may include Dynasylan DAMO and Dynasylan 9165. Blends of Dynasylan DAMO and Dynasylan 9165 may be used. These may be thermally stable at temperatures up to about 370° C. or higher.

The glass reinforcing resin may be surface treated with one or more titanates, one or more zirconates, or a mixture thereof. The titanates and zirconates may comprise one or more organometallic complexes of titanium or zirconium complexed by one or more organic compounds containing functional groups attached to a hydrocarbon linkage. The organic compounds may contain one or more, and in one embodiment, two or more functional groups. The functional groups may comprise one or more of =O, =S, —OR, —SR, —NR$_2$, —NO$_2$, =NOR, =NSR and/or —N=NR, wherein R is hydrogen or a hydrocarbon group (e.g., alkyl or alkenyl) of 1 to about 10 carbon atoms. The titanates and zirconates may include alkoxy titanates and coordinate zirconates. These may include the alkoxy titanates available under the tradenames LICA 12 or KR-PRO, and coordinate zirconates available under the tradenames KZ 55 or KR 55.

The polymer composition may further comprise one or more pigments, dyes, optical brighteners, flame retardants, or a mixture of two or more thereof. The concentration of each of these additional additives in the polymer composition may be in the range up to about 1% by weight based on the total weight of the polymer composition, and in one embodiment from about 0.01 to about 0.5% by weight. The concentration of each of these additional additives in the additive composition that may be used in making the polymer composition may be in the range up to about 30% by weight based on the total weight of the additive composition, and in one embodiment from about 1 to about 20% by weight.

The polymer composition may be made by combining the thermoplastic resin with the additive composition. The melt processable glass reinforcing resin may be initially combined with the thermoplastic resin and/or the additive composition. The additive composition may comprise the dispersant, inorganic particulates and dye concentrate, as described above. The additive composition may further comprise one or more antioxidants, UV light stabilizers, heat stabilizers, antistatic agents, pigments, additional dyes, optical brighteners, flame retardants, melt processable glass reinforcing resins, or a mixture of two or more. The additive composition may be present in the polymer composition in an amount of at least about 0.1% by weight of the total weight of the polymer composition, and in one embodiment from about 0.1 to about 3% by weight, and in one embodiment from about 0.3 to about 2% by weight.

The additive composition may be in the form of a paste or a dry powder. In one embodiment, the additive composition may comprise a homogenous, free-flowing, dry powder. The additive composition may be capable of acting as an internal lubricant or processing aid by increasing the flow and/or decreasing the shear of the polymer composition. This may allow for shorter production cycle times for producing molded products such as, for example, optical lenses, reduce the processing temperature of the polymer composition. This may allow for precision molding of details to less than about one micron on a molded product such as an optical lens. The additive composition may have excellent dispersion properties to allow for homogenous dispersion of inorganic particulates (e.g., nanoparticles) and/or antioxidants as well as other additives in the polymer composition or molded articles made therefrom. The additive composition may be hydrolytically stable, which may provide for improved aging of articles molded in humid environments. The additive composition may also have a relatively high optical clarity, which contributes to retaining and improving optical clarity and light transmission of molded articles made from the polymer composition. Additionally, it may be desirable that the additive composition has no adverse affect on secondary operations such as, for example, printing, bonding, and/or coating molded articles made from polymer compositions containing the additive composition. The additive composition may be non-yellowing and provide resistance to yellowing of molded products that are exposed to high temperatures and/or high humidity.

The additive composition may be thermally stable up to about 350° C., and in one embodiment, up to about 400° C. or higher. This allows for processing of a thermoplastic resin and the additive composition at temperatures up to about 350° C., and in one embodiment up to about 400° C. This thermal stability may also improve the thermal aging of the polymer composition and molded articles made therefrom.

In one embodiment, the additive composition may be a homogenous, free-flowing, dry-power additive composition having the formula shown in Table 5.

TABLE 5

| Material: | % by Weight of Total Additive Composition: |
|---|---|
| (1) Mixture of saturated and unsaturated fatty esters; or (2) mixture of organic fatty amides with surfactants; or a mixture of (1) or (2) | 30-99 |
| Dye Concentrate/dry powder | 0.05-4 |
| Inorganic particulates with average particle size <100 nm/dry powder | 0.5-30 |
| High molecular weight, low volatility primary antioxidant | 0-30 |
| High molecular weight, low volatility secondary antioxidant | 5-50 |
| UV (ultra-violet) Light Stabilizer | 0-30 |

Examples of non-limiting embodiments of suitable additive compositions are shown in Tables 6-8. The additive composition in Table 6 may be suitable for use in making, for example, high temperature, optically clear thermoplastic composites for use in applications, such as camera lenses, where the lens is capable of surviving lead free solder reflow processing temperatures.

TABLE 6

| Material: | % by Weight of Total Additive Composition: |
|---|---|
| (1) Mixture of saturated and unsaturated fatty esters; or (2) mixture of organic fatty amides with surfactants; or a mixture of (1) and (2) | 82.98 |
| Dye Concentrate/dry powder | 2.0 |
| Inorganic particulates with average particle size <100 nm | 0.86 |
| High molecular weight, low volatility primary antioxidant | 14.16 |
| Total | 100 |

The additive composition in Table 7 may be suitable for use in making, for example, polymer compositions that may be used to make high temperature, optically clear molded articles that have enhanced thermal oxidative and hydrolytic oxidative resistance. Suitable applications may include camera lenses and LED's, where the lens is capable of surviving lead free solder reflow processing temperatures, is used at high operating temperatures greater than about 85° C., is simultaneously subjected to a relative humidity greater than about 60%, and is subjected to intense transmission of narrow, short wavelength light bands (for example, 450 nm).

TABLE 7

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 52 |
| Dye Concentrate/dry powder | 2 |
| Inorganic particulates with average particle size <100 nm | 6 |
| High molecular weight, low volatility primary antioxidant | 8 |
| High molecular weight, low volatility secondary antioxidant | 32 |
| Total | 100 |

The additive composition in Table 8 may be suitable for use in making, for example, polymer compositions that may be used to make high temperature, optically clear thermoplastic composites that have enhanced thermal oxidative, hydrolytic oxidative resistance, and photolytic oxidative resistance. Suitable applications may include camera lenses and LED's, where the lens is capable of surviving lead free solder reflow processing temperatures, is used at high operating temperatures greater than about 85° C., is simultaneously subjected to a relative humidity greater than about 60%, is subjected to intense transmission of narrow, short wavelength light bands (for example, 450 nm), and is subjected to incidental sunlight.

TABLE 8

| Material: | % by Weight of Total Additive Composition: |
|---|---|
| (1) Mixture of saturated and unsaturated fatty esters; or (2) mixture of organic fatty amides with surfactants; or a mixture of both (1) and (2) | 50.6 |
| Dye Concentrate/dry powder | 2 |
| Inorganic particulates with average particle size <100 nm | 6 |
| High molecular weight, low volatility primary antioxidant | 6 |
| High molecular weight, low volatility secondary antioxidant | 27.4 |
| UV (ultra-violet) Light Stabilizer | 8 |
| Total | 100 |

The additive composition that may be used to make the polymer composition may be thermally stable up to a temperature of about 400° C. or greater. This additive composition may include at least one fatty ester, at least one fatty amide, or a mixture thereof, that are thermally stable up to about 400° C. or greater, and a dye concentrate that is thermally stable up to about 400° C. or greater. This additive composition may include one or more of blue dye, violet dye, inorganic particulates, primary antioxidant, secondary antioxidant, and/or UV light stabilizer, each of which may be thermally stable up to about 400° C. or higher.

In one embodiment for producing an injection moldable, ultra-high temperature optical thermoplastic with a suitable viscosity for injection molding at temperatures up to about 400° C., an additive composition comprising the following ingredients may be used:

(a) at least about 40% by weight, of the total weight of the additive composition of a dispersant, the dispersant comprising (1) a mixture of saturated and unsaturated fatty esters; or (2) mixture of organic fatty amides with surfactants; or a mixture of both (1) and (2)

(b) at least about 0.005% by weight of the total weight of the additive composition of a mixture of high temperature stable blue and violet organic dyes, which may be in the form of a dye concentrate comprising (i) at least about 96% by weight of the total weight of dye concentrate of (1) a mixture of saturated and unsaturated fatty esters, or (2) a mixture of organic fatty amides with surfactants, or a mixture of both (1) and (2); (ii) at least about 0.05% by weight of the total weight of the dye concentrate composition of a mixture of high temperature stable blue and violet organic dyes, and (iii) at least about 0.1% by weight of the total weight of the dye concentrate of high temperature stable, transparent, inorganic particulates having an average particle size less than about 100 nanometers, and in one embodiment less than about 50 nanometers, the inorganic particulates having an index of refraction of about 1.4-1.8, and in one embodiment an index of refraction of about 1.52-1.58;

(c) up to about 30% by weight, of the total weight of the additive composition of a primary antioxidant, which may be in the form of a high molecular weight, low volatility hindered phenol;

(d) at least about 10% by weight of the total weight of the additive composition of a secondary antioxidant, and in one embodiment from about 25 to about 40% by weight of the total weight of the additive composition, the secondary antioxidant being in the form of a high molecular weight, low volatility phosphite having a melting temperature greater than about 200° C.;

(e) at least about 0.05% by weight of the total weight of the additive composition of high temperature stable, transparent, inorganic particulates having an average particle size less than about 100 nm, and in one embodiment less than about 50 nm, the particulates having an index of refraction of about 1.54-1.58; and (f) at least about 2% by weight of a UV light stabilizer.

The additive composition may be made by (1) mixing the dye concentrate (b) with the dispersant (a), and then (2) mixing, and optionally grinding, the resultant mixture from (1) with the inorganic particulates (e), and, optionally, with the primary antioxidant (c), secondary antioxidant (d), and/or UV light stabilizer (f).

In one embodiment for producing an injection moldable, ultra-high temperature optical thermoplastic with a suitable viscosity for injection molding at temperatures up to about 400° C., an additive composition comprising the following ingredients may be used:

(a) at least about 40% by weight, of the total weight of the additive composition, of at least one zirconate;

(b) at least about 0.005% by weight of the total weight of the additive composition of a mixture of high temperature stable blue and violet organic dyes, which may be in the form of a dye concentrate comprising (i) at least about 96% by weight of the total weight of dye concentrate of a zirconate, (ii) at least about 0.05% by weight of the total weight of the dye concentrate of a mixture of high temperature stable blue and violet organic dyes, and (iii) at least about 0.1% by weight of the total weight of the dye concentrate of high temperature stable, transparent, inorganic particulates having an average particle size less than about 100 nanometers, and in one embodiment less than about 50 nanometers, the inorganic particulates having an index of refraction of about 1.4-1.8, and in one embodiment an index of refraction of about 1.52-1.58;

(c) up to about 30% by weight, of the total weight of the additive composition of a primary antioxidant, which may be in the form of a high molecular weight, low volatility hindered phenol;

(d) at least about 10% by weight of the total weight of the additive composition of a secondary antioxidant, and in one embodiment about 25-40% by weight of the total weight of the additive composition, the secondary antioxidant being in the form of a high molecular weight, low volatility phosphite having a melting temperature greater than about 200° C.;

(e) at least about 0.05% by weight of the total weight of the additive composition of high temperature stable, transparent, inorganic particulates having an average particle size less than about 100 nm, and in one embodiment less than about 50 nm, the particulates having an index of refraction of about 1.54-1.58; and (f) at least about 2% by weight of a UV light stabilizer.

The additive composition may be made by (1) mixing the dye concentrate (b) with the zirconate (a), and then (2) mixing, the resultant mixture from (1) with the inorganic particulates (e), and, optionally, with the primary antioxidant (c), secondary antioxidant (d), and/or UV light stabilizer (f).

It may be desirable that the additives, when processed with the thermoplastic resin, not yellow or degrade when subjected to process temperatures of about 300° C. to about 400° C., while providing other useful features and benefits to the molded articles, for example, optical lenses. Without being bound to any particular theory, the additive composition may possess one or more of the characteristics and provide one or more of the benefits listed in Table 9.

TABLE 9

| Features: | Benefits: |
| --- | --- |
| Internal lubricant & processing aid | Increases flow, decreases shear of the ultra-high temperature polymer composition; shortens production cycle times for producing optical lenses; reduces processing temperature of the polymer composition; allows for precision molding of details on optical lenses to less than one micron. |
| Excellent dispersion qualities | Allows for homogeneous dispersion of nano-particles & organic anti-oxidants in the ultra-high temperature, optical plastic and optical plastic lenses. |
| Hydrolytically stable | Improves aging of molded plastic lenses in humid environments |
| Thermally stable up to 400° C. | The additives and the polymer composition may be processed at temperatures up to about 400° C.; Improves thermal aging of the polymer composition during molding and after molding. The additive composition may be essentially non-yellowing during molding operations. The molded, optical lenses may have good resistance to yellowing when exposed to high temperatures and high humidity. |
| Optical Clarity | Retains and improves optical clarity and light transmission of the molded articles, e.g., ultra-high temperature, optical plastic lenses. |
| Secondary operations | Causes no adverse effect on secondary operations such as printing, bonding, & coating of the molded, optical plastic lenses. |

In one embodiment, the polymer composition may be an ultra-high temperature, optical thermoplastic comprising a high temperature thermoplastic resin and an additive composition that is thermally stable up to about 400° C. or higher. An injection moldable, ultra-high temperature optical polymer material with a suitable viscosity for injection molding at temperatures up to about 400° C. and which may be used to make a high temperature resistant, optical plastic lens articles having one or more characteristics identified in Table 12 may be provided by:

(1) Providing an appropriate thermoplastic resin, in the form of pellets, in an amount of at least about 97% by weight of the total weight of the polymer composition.

(2) Providing at least about 0.2 by weight of the total weight of the polymer composition of an additive composition such as, for example, the additive composition disclosed in Table 5.

(3) Heating the thermoplastic resin pellets, to at least about 100° C., and in one embodiment to at least about 145° C., and drying the pellets to a moisture content less than about 0.01% by weight of the total weight of the pellets.

(4) Introducing at least about 0.2% by weight, and in one embodiment from about 0.5 to about 1.2%, of the total weight of the thermoplastic resin pellets, of the dry powder additive composition of Table 5 onto the heated pellets and tumble blending the additive composition onto the heated pellets, causing the additive composition to melt onto or surround the heated pellets and coat the pellets with the additive composition, and when cooled, resulting in the thermoplastic resin pellets being substantially uniformly coated with a an additive composition.

The resulting polymer composition may be further described with reference to Table 10.

TABLE 10

| Material: | % by Weight of Total Thermoplastic Composition: |
| --- | --- |
| (1) Mixture of saturated and unsaturated fatty esters; (2) mixture of organic fatty amides with surfactants; or (3) zirconates; or a mixture of (1), (2) and/or (3) | 0.2-1 |
| Dye Concentrate | 0.003-0.08 |
| Inorganic particulates with average particle size <100 nm | 0.0001-1 |
| High molecular weight, low volatility primary antioxidant | 0-0.2 |
| High molecular weight, low volatility secondary antioxidant | 0.05-0.3 |
| UV (ultraviolet light) stabilizer | 0-0.15 |
| Polycarbonate resin, APEC ® TP-0277 | 97.3-99.75 |

The inventive polymer compositions may be capable of withstanding processing temperatures of up to about 400° C., and in one embodiment from about 300° C. to about 400° C. These may be suitable for making high temperature optical lens articles having one or more desirable characteristics, such as those listed in Table 13. Also, there may be different types of injection molding machines, methods of injection molding, and mold designs that may be used to mold both simple and complex lens articles using these polymer compositions. Additionally, these polymer compositions may be suitable for making high temperature resistant films by extrusion methods and solvent casting methods. The polymer composition may be useful in making versatile products of high temperature resistance that may be optically clear using various injection molding processes, with varying mold designs, and for producing plastic optical lens articles with varying designs, varying applications, and varying optical an physical properties. Examples of suitable, non-limiting, materials for these purposes are disclosed in Table 11 below.

TABLE 11

| Material Type & Description: | Example/Function/Source: |
| --- | --- |
| 1. Mixture of saturated and unsaturated fatty esters; mixture of fatty acids, esters & gycerides | INT-40DHT; Axel Plastic Research Laboratories, Inc., Woodside, NY; dry powder; internal lubricant, process aid, dispersant for inorganic particulates (e.g., nanomaterials) and other additive materials; hydrophobic; internal mold release; no adverse effect on mechanical properties or secondary operations such as surface coating of the thermoplastic resin; melts @ about 65° C.; thermally stable to about 400° C. |
| 2. Mixture of organic fatty amides and surfactants | INT-33 UDY; Axel Plastic Research Laboratories, Inc., Woodside, NY; dry powder; internal lubricant, process aid, mold release agent; dispersant for inorganic particulates (e.g., nanomaterials) and other additive materials; hydrophobic; no adverse effect on mechanical properties or secondary operations such as surface coatings of the thermoplastic resin; melts @ about 145° C.; thermally stable to about 350° C.; or, alternatively, INT-33 UDS; Axel Plastic Research Laboratories, Inc., Woodside, NY; dry powder; internal lubricant, process aid, mold release agent; dispersant for inorganic particulates (e.g., nanoparticles) and other additive materials; hydrophobic; no adverse effect on mechanical properties or secondary operations such as surface coatings of the thermoplastic resin; melts @ about 145° C.; thermally stable to about 400° C. |
| 3. Titanates and/or zirconates | Titanates and/or zirconate. Alkoxy titanate such as LICA 12 or KR-PRO, from Kenrich Petrochemicals, Inc., Bayonne, NJ, and/or coordinate zirconates such as KZ 55 or KR 55, from Kenrich (KEN-REACT Reference Manual, February, 1985, Kenrich Petrochemicals, Inc.), in liquid or powder form. To create a powder, the liquid titanate or zirconate may be absorbed or adsorbed onto inorganic particulates (e.g., fumed silica or aluminum oxide), in suitable consistency. The titanates LICA 12 or KR-PRO may be thermally stable up to about 350° C. or higher in a polymer matrix. The zirconates KZ-55 or KR 55 may be thermally stable up to about 400° C. in a polymer matrix. The titanates may be internal lubricant, process aid, dispersant and/or coupling agent for inorganic particulates (e.g., nanoparticles) and other additive materials. The titanates and/or zirconates may be hydrophobic. |
| 4. Dye Concentrate/dry powder | HTLT Dye Concentrate; Suncolor Corporation; melts @ 125° C.; thermally stable to over 400° C.; provides consistent, uniform color quality correcting yellow color formation in the host thermoplastic resin; optically clarifying the thermoplastic resin. |
| 4a. High temperature stable blue dye/dry powder | Amplast Blue R3 or Amplast Blue HB; ColorChem International Corp., Atlanta, GA, insoluble blue dye; melts @ 170° C.; thermally stable to 400° C. particularly when combined with a mixture of saturated and unsaturated fatty esters or amides/dry powder and high temperature resistant, inorganic particulates (e.g., nanomaterials). |
| 4b High temperature stable violet dye/dry powder | Amplast Violet BV or Amplast Violet PK; ColorChem International Corp., Atlanta, GA, insoluble violet dye; melts @ 170° C.; thermally stable to 400° C. particularly when combined with a mixture of saturated and unsaturated fatty esters or amides/dry powder and high temperature resistant, inorganic particulates (e.g., nanomaterials). |
| 5. Inorganic particulates with average particle size <100 nm/dry powder | Aluminum Oxide C or AEROXIDE Alu US; Degussa Corporation, Piscataway, NJ; average particle size less than about 100 nm, and in one embodiment less than about 50 nm; dry powder dispersant and suspension aid; flow aid for thermoplastics; high temperature resistance in excess of 1000° C.; aids in the uniform dispersion of visible light. |
| 6. High molecular weight, low volatility primary antioxidant | Cyanox 1790; Cytec Industries, West Paterson, NJ; primary hindered phenolic stabilizer (1,3,5-Tris(4-t-butyl-3-hydroxy-2,6-dimethylbenzyl) s-triazine-2,4,6-(1H,3H,5H)-trione); melts @ 160° C.; thermally stable to 400° C. when combined with a mixture of saturated and unsaturated fatty esters or amides/dry powder and high temperature resistant, inorganic particulates (e.g., nanomaterials); reduces or eliminates yellowing of the thermoplastic resin during high temperature processing. |

TABLE 11-continued

| Material Type & Description: | Example/Function/Source: |
| --- | --- |
| 7. High molecular weight, low volatility secondary antioxidant | Doverphos S-9228PC; Dover Chemical Corporation, Dover, OH; solid phosphite antioxidant (Bis (2,4-dicumylphenyl) pentaerythritol diphosphite); thermally stable to 400° C. when combined with a mixture of saturated and unsaturated fatty esters or amides/dry powder and high temperature resistant, inorganic particulates (e.g., nanomaterials); reduces yellowing of the thermoplastic resin during high temperature processing; melts @ 220-233° C.; provides hydrolytic and thermal stability to the thermoplastic resin and other thermoplastic materials in the additive composition during processing of the thermoplastic resin and provides long term hydrolytic, photolytic, and thermal stability to the molded articles. |
| 8. UV (ultra-violet) Light Stabilizer | Hostavin B-CAP; Clariant Corporation, Charlotte, NC; solid Benzylidene Malonate UV Absorber (Tetraethyl 2,2' (1,4-Phenylenedimethylidyne)Bis Malonate); thermally stable to 400° C., for short temperature cycles when combined with thermogravically stable mixture of saturated and unsaturated fatty esters, fatty acids, fatty amides, and high temperature resistant, inorganic nanomaterials; melts @ 137-140° C.; provides hydrolytic and thermal stability to the thermoplastic resin and other thermoplastic materials in the additive composition during processing of the polymer composition and provides long term hydrolytic, photolytic, and thermal stability to the molded articles. |
| 9. Polycarbonate resin | APEC ® TP 0277 or Apec 9399; Bayer Material Science LLC, Pittsburgh, PA; transparent, high temperature polycarbonate made from Bisphenol A, and/or Bisphenol M, and Bisphenol TMC, having a Tg of about 225° C. or higher. |
| 10. Biphenol | 4,4' BIPHENOL, Schenectady International, Schenectady, NY 12301; having a melt temperature greater than 200° C., as an additive to moderate or increase the refractive index of the thermoplastic resin (e.g., polycarbonate). The biphenol may be used alone or with a compatible catalyst to increase the Tg of the thermoplastic resin. The biphenol may improve the UV light and short visible light resistance of the thermoplastic resin. |
| 11. Other inorganic particulates | Silicon dioxide, silicon, cerium oxide, titanium dioxide, zirconium oxide, and mixtures thereof; mixtures of one or more of the foregoing with aluminum oxide; either as a dry powder or in a solvent suspension (e.g., suspension in toluene); used as a reinforcing agent, dispersing agent, and/or an agent to increase the refractive index and to increase the temperature resistance of the polymer composition. These may be available from Degussa Corporation, Piscataway, NJ and Melorium Technologies, Inc., Rochester, NY. |
| 12. Melt processable glass resin | Phosphate glass which may provide the polymer composition with a higher Tg than the Tg of the polymer composition without the phosphate glass and may increase the the temperature resistance, stiffness and modulus of the polymer composition while reducing the shrinkage of the polymer composition upon cooling in the mold and making the molded polymer composition more abrasion resistant. A suitable phosphate glass may be 908YRL, having a Tg of about 309° and a refractive index of about 1.55-1.57, which may be available from Corning. Other suitable phosphate glass compositions are described in U.S. Pat. No. 6,667,258 B2 and U.S. Pat. No. 5,153,151. While it is desirable to match, as closely as possible, the refractive indexes of the polymer and the phosphate glass, it may also be desirable to use a phosphate glass having a higher refractive index than the polymer composition in order to increase the overall refractive index of the polymer composition. |
| 13. Silanes, surface treatments and coupling agents | Silane surface treatments such as Dynasylan OCTEO (octyltriethoxysilane) and surface treatments and fuctional coupling agents such as Dynasil 9165 (phenyltrimethoxysilane), Dynasil DAMO (N-2-Aminoethyl-3-aminopropyltrimethoxysilane), or mixtures thereof, available from Degussa Corporation, Parsipany, NJ, having high temperature stability greater than about 350° C., for treating inorganic particulates and melt |

TABLE 11-continued

| Material Type & Description: | Example/Function/Source: |
|---|---|
| | processable glass resin to improve dispersion into polymer resins, improve mixing, improve mechanical strength, promote hydrophobicity, and decrease water-vapor transmission. |
| 14. Other internal dispersants, lubricants, and mold release agents, and materials | hydrocarbon agents, such as natural and synthetic paraffins, polyethylene waxes, fluorocarbons, etc., fatty acid agents, such as stearic acid, hydroxystearic acid, other higher fatty acids, hydroxy fatty acids, etc., fatty amide agents, such as stearamide, ethylenebisstearamide, other alkylene bis fatty amides, etc., alcohol agents, such as stearyl alcohol, cetyl alcohol, other fatty alcohols, polyhydric alcohols, polyglycols, polyglycerols, etc. fatty acid ester agents, such as butyl stearate, pentaerythritol tetrastearate, other fatty acid esters of lower alcohols, fatty acid esters of polyhydric and monohydric alcohols, fatty acid esters of polyglycols, etc., and silicone mold release agents, such as silicone oils, etc., these agents being thermally stable to about 350° C., and in one embodiment preferably up to about 400° C.; pigments, dyes, optical brighteners, flame retardants, and conductive polymers. |

Examples of suitable high temperature polymer compositions in accordance with the disclosed invention may include the compositions listed in Table 12.

TABLE 12

| Material | Additive/% by Weight of Total Thermoplastic Composition: | | |
|---|---|---|---|
| Additive Composition from Table 6, 7 or 8 | Table 6 | Table 7 | Table 8 |
| 1. Additive Composition (wt %) | 0.35 | 0.60 | 0.65 |
| 2. Polycarbonate resin, APEC ® TP-0277 | 99.65 | 99.40 | 99.35 |

The polymer composition may be made by providing the thermoplastic resin material in pellet form, heating the thermoplastic resin pellets to a suitable temperature, e.g., at least about 70° C., and in one embodiment in the range from about 70° C. to about 155° C., and in one embodiment from about 100° C. to about 135° C., and in one embodiment from about 135° C. to about 155° C., and mixing a desirable concentration of the additive composition with the heated pellets. The pellets may have any desirable shape including spheres, cubes, cylinders, rods, irregular shapes, and the like. The pellets may have an average particle size in the range from about 1 micron to about 10,000 microns, and in one embodiment from about 500 to about 1000 microns. Without being bound to any particular theory, upon mixing with the heated pellets, the additive composition is believed to melt onto the surface of the heated pellets and coat the pellets. In one embodiment, the pellets may be substantially uniformly coated with the additive composition.

The polymer composition may have a Tg of at least about 220° C., and in one embodiment at least about 230° C., and in one embodiment at least about 240° C., and in one embodiment at least about 250° C., and in one embodiment at least about 260° C., and in one embodiment at least about 270° C., and in one embodiment at least about 275° C., and in one embodiment at least about 280° C.

For optical grade thermoplastics which are to be used in lead free solder reflow applications, it may be desirable that the molded plastic materials have a Tg, measured by DMTA (with a 4° C./min. temperature range), higher than about 250° C. For most lens applications, the molded optical grade thermoplastic may have visible light transmission properties, in the visible light range of 400-1000 nm, of at least about 85% after surface reflective losses. In addition, these optical grade thermoplastic lens parts may have other important properties. These may include high optical clarity, very low color, very low haze, photolytic stability, hydrolytic stability, and thermal stability for operational use in environments from about −20° C. to about 85° C., inclusive of environments with a relative humidity greater than about 80%. In many LED lighting applications, the polymer composition may have an operating temperature capability in excess of about 100° C., and, in other cases, in excess of about 150° C. In many cases, the molded material may have a clean surface on which optical coatings can be attached and bonded. Table 13 provides a summary of the optical, mechanical, and material properties that may be achieved using the inventive polymer composition for making injection molded plastic lenses.

TABLE 13

| | |
|---|---|
| Water-WhiteClarity/CleanOptical Surfaces/Injection Moldable | Low Haze (0.5); Low Color (Y.I./0.5); High Visible Light Transmission 90%) |
| Superior Impact Resistance | High Index of Refraction (1.555/High Light Output) |
| High Visible Light Transmission | Surface Treatable: (AR Coatings/Max. Illumination) |
| Excellent Thermal Oxidative Stability | High Tg (>250° C./DMTA 2° C./min. ramp) |
| Excellent Hydrolytic Oxidation Stability | Excellent Photolytic Oxidative Stability (450 nm) |

The optical and/or physical properties of the polymer composition may be unsuitable for various applications, and, therefore, it may be advantageous to upgrade and customize the polymer composition by compounding before their use to satisfy the requirements of the desired application. Conventional compounding of a polymer composition at high melt temperatures, particularly higher than about 300° C., may result in an additional heat history that may be disadvantageous. At these processing temperatures, a thermoplastic resin such as polycarbonate may degrade. Degradation of the thermoplastic resin and certain additive materials may manifest itself in discoloration, e.g., yellowing, which may reduce its light transmission in the visible part of the light spectrum making the molded article less suitable or unsuitable for use as a lens. This problem may be intensified when organic additives are present and the processing temperatures ranges from about 300 to about 400° C. as the organic materials may volatilize and cause further yellowing and black specs to form.

While optical thermoplastic compositions in accordance with the invention may be processed with conventional compounding methods, in one embodiment, an optical device may be manufactured in a continuous injection molding process leading directly from the raw material to the molded article. The additive composition, polymer composition, and methods for making the same, as described herein, may provide smooth, dry, additive coated thermoplastic pellets, which may be injection moldable without compounding, and the molded article, e.g., optical lens, may be processed directly from the raw materials to form the final molded article, e.g., optical lens. Using the inventive additive compositions and polymer compositions, and employing the methods to manufacture the coated thermoplastic pellets, a plastic lens may be injection molded having optical properties which are superior to the optical properties of the thermoplastic resin used in the polymer composition. The manufacturing of the thermoplastic pellets may be cost effective and may be accomplished using existing drying and tumbling equipment. The method for manufacturing the coated pellets, as described herein, may be particularly useful in making camera and LED lens articles that are extremely small, weighing only, in some cases, 0.25 grams (the approximate weight of one or two pellets). By coating pellets substantially uniformly, each pellet may contain about 100% by weight of the entire polymer composition, ensuring that each lens part made may also comprise about 100% by weight of the polymer composition. When incorporating more than about 2% by weight of inorganic particulates and/or melt processable glass reinforcing resins into the polymer composition, it may be useful to first compound the inorganic particulates and/or melt processable glass reinforcing resins into the polymer composition using conventional compounding methods and up to about 0.3% by weight of each of a high temperature stable dispersing agent and/or primary antioxidant to form the pellets. The pellets may then be coated with the additive composition as described above, followed by injection molding and/or extruding.

Molded articles, for example, those having a thickness of about 1 mm, made from the inventive polymer composition may have an index of refraction of about 1.55, and in one embodiment about 1.56. These molded articles may have a luminous transmittance of at least about 85% of the maximum theoretical value of the luminous transmittance, and in one embodiment at least about 88%. The molded articles may have of haze of less than about 3, and in one embodiment less than about 1. They may have a yellowness index of less than about 3, and in one embodiment less than about 1. The molded articles may have a visible light transmission of at least about 85% after surface reflective losses, and in one embodiment at least about 88%.

The inventive polymer composition may provide numerous advantages over prior art materials, including one or more of the following. The polymer compositions, when molded, may have excellent optical properties. Lenses made with the polymer compositions may have a high index of refraction, which may be useful for making camera lenses and LED lens with high illumination capability. The camera lenses may include high temperature light transmissible thermoplastic (HTLT) cellular camera lenses and HTLT LED lenses. The camera lenses may be used in camera modules for use in making cameras, for example, mobile phone cameras. Lenses made with the polymer compositions may have a high glass transition temperature and may be used in solder reflow applications, particularly lead free solder reflow applications which may have high operating temperatures. The polymer compositions may have a viscosity lower than the base thermoplastic resin so that conventional plastic processing techniques may be used. The polymer compositions may be molded at temperatures in the range from about 300° C. to about 400° C. without compromising optical, mechanical and/or other physical properties of the molded articles, e.g., molded lenses. The polymer compositions may be injected into molds having temperatures as high as about 235° C. without sticking and without the use of external mold release agents. This may include processes where the resultant molded article, such as a molded lens part, may be annealed or stress relieved in the hot molds as a normal part of the molding process. The polymer compositions, when molded, may be effectively annealed or stressed relieved with conventional annealing methods, resulting in improved or optimized mechanical and thermal properties. The polymer compositions, when molded, may have superior thermal oxidative, hydrolytic oxidative, and/or photolytic oxidative resistance properties and remain stable and clear in a wide variety of environmental conditions suitable for applications such as LED's and automotive headlights. The polymer compositions may be used to accurately mold extremely small lens parts having details as fine as micron and sub-micron in size. The lenses produced from the polymer compositions may be surface treated with a wide variety of organic and/or metal oxide coatings, including anti-reflective coatings. The underside of the lenses may be filled and bonded with adhesives and soft silicone encapsulents for LED and other semiconductor and electronic applications.

The polymer composition, and the methods for making the same, may not be limited to use in high temperature, optical thermoplastic composites. The polymer composition may be used alone or in combination with other additives to make high temperature pigment filled, mineral filled, and/or nanomaterial filled composites, including high index of refraction, optical nanomaterial thermoplastic composites, using a high temperature thermoplastic resin in accordance with the disclosed invention or other thermoplastic resins, e.g., polycarbonate and polysulfone resins, encompassing many of the features and benefits of the disclosed polymer compositions and molded articles made from the same. The polymer composition may also be used to make optical thermoplastic composite materials using other thermoplastic resins, e.g., polycarbonate and polysulfone resins, having lower temperature resistant properties, yet resulting in thermoplastic composite materials encompassing many of the same features and benefits of the disclosed high temperature thermoplastic composite materials.

The invention may be further understood with reference to the following examples. The examples are provided for the purpose of further illustrating various aspects of the invention and are not intended to limit the invention in any manner.

EXAMPLE 1

A dye concentrate is prepared by mixing and grinding the materials shown in the following Table 14:

TABLE 14

| Material: | % by Weight of Total Dye Concentrate Formula: |
|---|---|
| Mixture of saturated and unsaturated fatty esters; INT-40DHT | 99.4 |
| High temperature stable blue dye/dry powder; Amplast Blue R3 Dye | 0.2 |
| High temperature stable violet dye/dry powder; Amplast Violet BV Dye | 0.2 |
| Inorganic particulates with average particle size <100 nm; Aluminium Oxide C | 0.2 |
| Total | 100 |

An additive composition is prepared by mixing and grinding the foregoing dye concentrate and the materials listed in the following Table 15:

TABLE 15

| Material: | % by Weight of Total Additive Composition: |
|---|---|
| (1) Mixture of saturated and unsaturated fatty esters; INT-40 DHT | 52.0 |
| Dye Concentrate; Dye Concentrate Formula from Table 14 | 1.8 |
| Inorganic particulates with average particle size <100 nm; Aluminium Oxide C | 6 |
| High molecular weight, low volatility primary antioxidant; Cyanox 1790 | 4 |
| High molecular weight, low volatility secondary antioxidant; Doverphos S-9228PC | 28.2 |
| UV (ultra-violet) Light Stabilizer; Hostavin B-CAP | 8 |
| Total | 100 |

The polymer composition shown in Table 16 is prepared using APEC®TP-0277 polycarbonate resin pellets and the additive composition shown in Table 15. The resin pellets are dried at 135° C. in a vacuum oven for 4 hours or until the moisture content is less than 0.01% by weight. The resin pellets are heated to 135° C., and the additive composition is added to the resin pellets at a weight ratio of 0.6:99.4 in a tumble blender. The resin pellets and additive composition are tumble blended for 5 minutes or until the additive composition melts onto and coats the resin pellets. The coated resin pellets are cooled at room temperature to a smooth, dry condition.

TABLE 16

| Material: | % by Weight of Total Thermoplastic Composition: |
|---|---|
| Mixture of saturated and unsaturated fatty esters; INT 40 DHT | 0.312 |
| Dye Concentrate; Example 1 above | 0.0108 |
| Inorganic particulates with average particle size <100 nm; Aluminium Oxide C | 0.036 |
| High molecular weight, low volatility primary antioxidant; Cyanox 1790 | 0.024 |
| High molecular weight, low volatility secondary antioxidant; Doverphos S-9228PC | 0.1692 |
| UV (ultraviolet light) stabilizer; Hostavin B-CAP | 0.048 |

TABLE 16-continued

| Material: | % by Weight of Total Thermoplastic Composition: |
|---|---|
| Polycarbonate resin,; APEC ® TP-0277 (Tg 235° C.) | 99.4 |
| Total | 100.0 |

An injection molded, polymeric lens article is made using the coated resin pellets described above. The coated pellets are heated at 125° C. to provide for a moisture level content of less than 0.01% by weight. A hopper on the injection molding machine is heated to about 80° C. A nitrogen blanket over the hopper may be employed.

The coated resin pellets are injection molded with a screw injection machine. The barrel capacity is sufficient to provide for a shot size of the pellets between 50 and 75% of capacity to minimize residence time in the barrel. The stock temperature is in the range from 320° C. to 380° C. Mold temperatures of 150° C. to 225° C. are used. The molding process conditions are as follows:

Injection Molding Processing Conditions

Nozzle 350-380° C.
Front 345-360° C.
Middle 340-350° C.
Rear 320-344° C.

The molded article has the following optical properties:
Index of refraction/589.93 nm/1.2 mm thickness/ASTM D-542
    1.5555
Actual light transmittance (1.2 mm thickness), 585 nm, %/ASTM D 1746
    89.3
Luminous transmittance, max. theoretical value, %/VASE ellipsometer, assuming polished, parallel sides of the tests specimen, so that the transmission is determined directly from the index of refraction.
    400 nm
    90.1
    700 nm
    91.0
    1000 nm
    91.2
Abbe Number/M-200 Ellipsometer, RetMeas software
    33.5
Haze, 1.2 mm thickness/ASTM D 1003
    <0.7
Yellowness Index/11.2 mm thickness/ASTM E313
    <0.7

Refractive Index Vs. Wavelength/M-200 Ellipsometer (Cauchy Dispersion Equations)

| | Wavelength (nm) | | | | |
|---|---|---|---|---|---|
| | 410.47 | 435.8 | 480.39 | 589.93 | 643.85 |
| Refractive Index | 1.5844 | 1.5776 | 1.5685 | 1.5550 | 1.5509 |

Refractive Index @ 589.3 nm Vs.
Temperature/M-200 Ellipsometer (Cauchy
Dispersion Equations)

| | Temperature (° C.) | | | | | | | |
|---|---|---|---|---|---|---|---|---|
| | −40 | −25 | 0 | 20 | 40 | 60 | 85 | 100 |
| Refractive Index | 1.5590 | 1.5579 | 1.5565 | 1.5550 | 1.5530 | 1.5510 | 1.5470 | 1.5454 |

Theoretical light transmission and actual light transmission data for the molded article are shown in FIG. 1. The plot on the right side of FIG. 1 is for two samples of the same material, each with a thickness of 1 mm.

EXAMPLE 2

Figure 3:
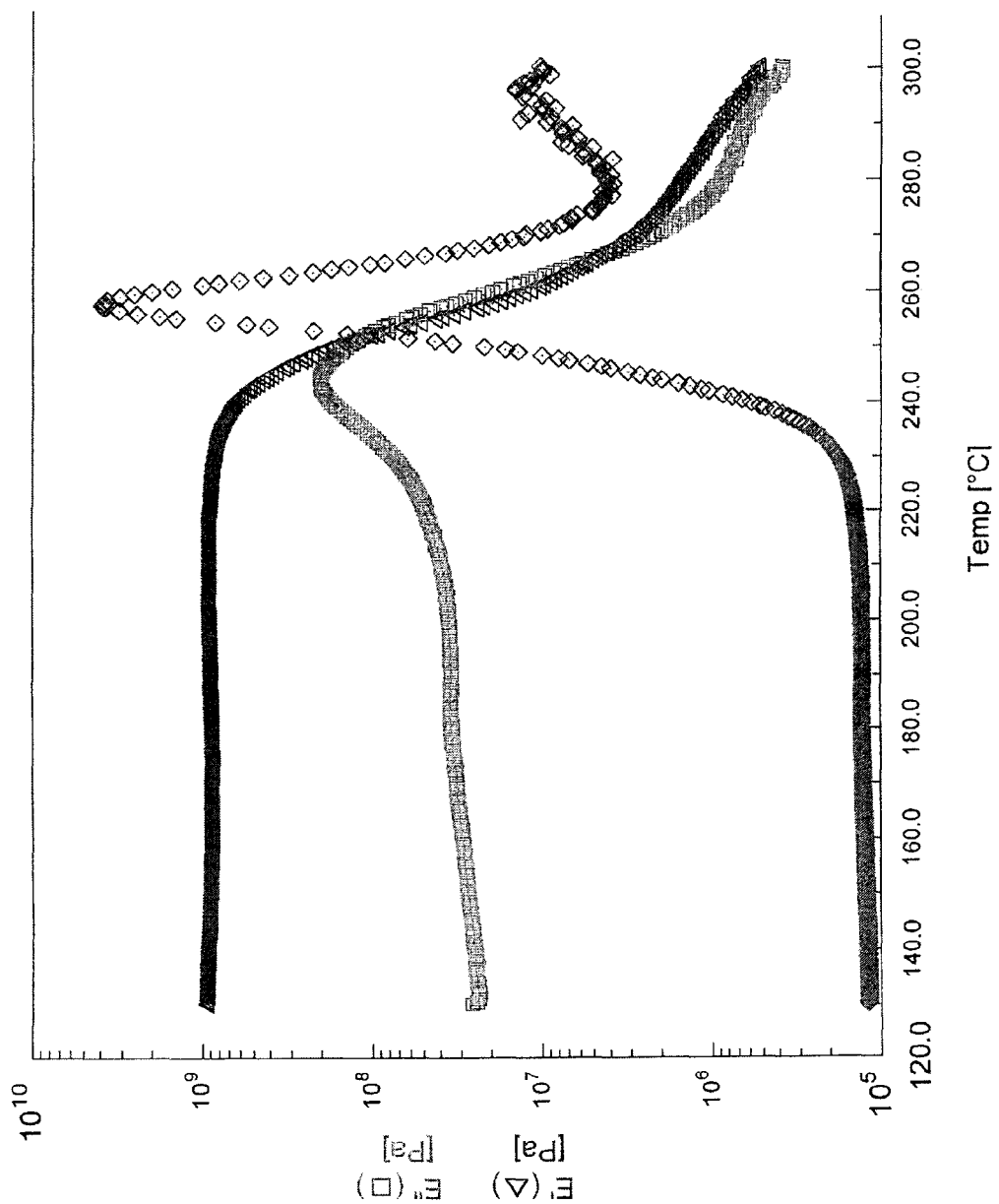
FIG. 3 is a DMTA graph of a high temperature, optical thermoplastic composition in accordance with an embodiment of the invention as described in Example 3.

The polymeric composition of Example 1 is molded into bars having the dimensions of 1×17×4 mm. The molded bars are tested by DMTA (Dynamic Mechanical Thermal Analysis) by ramping the temperature to beyond 260° at 2° C. per minute with a one herz load, and determining Tg. This test indicates that the molded bars are suitable to withstand short temperature spikes up to 260° C. and higher without deformation. The results are shown in FIG. 3.

EXAMPLE 3

Four polymer compositions identified below as compositions 1-4 and having the formulations indicated in Table 17 are injection molded to form LED lenses. The LED lenses are subjected to high temperature optical thermoplastic solder reflow studies with the results being shown in Table 18.

TABLE 17

| Material: | % by Weight of Total Thermoplastic Composition: |
|---|---|
| Mixture of saturated and unsaturated fatty esters; INT 40 DHT | 0.312 |
| Dye Concentrate; Example 1 above | 0.0108 |
| Inorganic particulates with average particle size <100 nm; Aluminium Oxide C | 0.036 |
| High molecular weight, low volatility secondary antioxidant; Doverphos S-9228PC | 0.05 |
| Composition # 1: | |
| Polycarbonate resin; | 99.5912 |
| APEC ® DP-9389-TMC blend (Tg 220° C.) | |
| Composition # 2: | |
| Polycarbonate resin; | 99.5912 |
| APEC ® DP-9389-TMC blend (Tg 226° C.) | |
| Composition # 3: | |
| Polycarbonate resin; | 99.5912 |
| APEC ® DP-9389-TMC blend (Tg 231° C.) | |
| Composition # 4: | |
| Polycarbonate resin; | 99.5912 |
| APEC ® DP-9389-TMC blend (Tg 235° C.) | |

TABLE 18

| Composition #1 | Composition #2 | Composition #3 | Composition #4 |
|---|---|---|---|
| Modified Apec 220 Vicat | Modified Apec 226 Vicat | Modified Apec 231 Vicat | Modified Apec 235 Vicat |

(Simulations & Actual Solder ReFlow Temperature Studies)

| Test No. | Polymer Composition | TEST Part Exposure SR | Oven/ Hot Plate Simulations | A | U | Pass/ Fail | Temp (° C.) | Exposure Time | Overall Shrinkage (%) |
|---|---|---|---|---|---|---|---|---|---|
| 1. | 1 | Fully Exposed | Oven | N | yes | P | 225 | 5 minutes | 1.1 |
| 2. | 1 | Fully Exposed | Oven | Yes/R | no | P | 225 | 5 minutes | 1.0 |
| 3. | 1 | Fully Exposed | Oven | Yes/R | no | P | 225 | 1 minute | 0.87 |
| 4. | 1 | In Lead Frame | Oven | Yes/R | no | F | 240 | 1 minute | N/A |
| 5. | 1 | In Lead Frame | Hot Plate | Yes/R | no | F | 240 | 1 minute | N/A |
| 6. | 1 | In Lead Frame | Hot Plate | Yes/R | no | P | 240 | 30 seconds | 0.85 |
| 7. | 1 | In Lead Frame | Oven | Yes/R | no | P | 240 | 30 seconds | 0.84 |
| 8. | 1 | In Lead Frame | Hot Plate | Yes/R | no | F | 250 | 30 seconds | N/A |
| 9. | 1 | In Lead Frame | Oven | Yes/S | no | F | 250 | 30 seconds | N/A |
| 10. | 2 | In Lead Frame | Oven | Yes/S | no | P | 240 | 1 minute | 0.90 |
| 11. | 2 | In Lead Frame | Hot Plate | Yes/S | no | P | 240 | 1 minute | 0.90 |
| 12. | 2 | In Lead Frame | Oven | Yes/S | no | F | 250 | 30 seconds | N/A |
| 13. | 2 | In Lead Frame | Hot Plate | Yes/S | no | F | 250 | 30 seconds | N/A |
| 14. | 3 | Fully Exposed | Oven | Yes/R | no | P | 240 | 5 minutes | 0.9 |
| 15. | 3 | Fully Exposed | Oven | Yes/R | no | F | 250 | 5 minutes | N/A |
| 16. | 3 | Fully Exposed | Oven | Yes/R | no | P | 240 | 1 minute | 0.88 |
| 17. | 3 | Fully Exposed | Oven | Yes/R | no | F | 250 | 1 minute | N/A |
| 18. | 3 | In Lead Frame | Hot Plate | Yes/R | no | P | 240 | 1 minute | 0.84 |
| 19. | 3 | In Lead Frame | Hot Plate | Yes/R | no | P | 250 | 30 seconds | 0.81 |
| 20. | 3 | In Lead Frame | Hot Plate | Yes/R | no | P | 250 | 1 minute | 0.84 |
| 21. | 3 | In Lead Frame | Oven | Yes/S | no | P | 250 | 30 seconds | 0.60 |
| 22. | 3 | In Lead Frame | Oven | Yes/S | no | P | 250 | 1 minute | 0.62 |
| 23. | 3 | In Lead Frame | Oven | Yes/S | no | F | 250 | 5 minutes | N/A |
| 24. | 3 | In Lead Frame | Oven | Yes/S | no | F | 260 | 30 seconds | N/A |
| 25. | 3 | In Lead Frame | Hot Plate | Yes/S | no | F | 260 | 30 seconds | N/A |

TABLE 18-continued

| | | | | | | | | | |
|---|---|---|---|---|---|---|---|---|---|
| 26. | 4 | Fully Exposed | Oven | no | yes | P | 240 | 5 minutes | 0.86 |
| 27. | 4 | Fully Exposed | Oven | no | yes | P | 250 | 5 minutes | 0.90 |
| 28. | 4 | Fully Exposed | Oven | no | yes | P | 260 | 1 minute | 0.89 |
| 29. | 4 | In Lead Frame | Hot Plate | Yes/R | no | P | 250 | 1 minute | 0.88 |
| 30. | 4 | In Lead Frame | Hot Plate | Yes/R | no | P | 260 | 1 minute | 0.89 |
| 31. | 4 | In Lead Frame | Hot Plate | Yes/R | no | P | 265 | 30 seconds | 0.90 |
| 32. | 4 | In Lead Frame | Oven | Yes/R | no | P | 250 | 1 minute | 0.84 |
| 33. | 4 | In Lead Frame | Oven | Yes/S | no | P | 260 | 1 minute | 0.60 |
| 34. | 4 | In Lead Frame | Hot Plate | Yes/S | no | P | 260 | 30 seconds | 0.59 |

| | | Solder ReFlow (Actual) Tests | SR OVEN (3 cycles) | | | | | 30 seconds (per cycle) | |
|---|---|---|---|---|---|---|---|---|---|
| 35. | 2 | In Lead Frame | SR Oven | Yes/S | no | P | 225 | 30 seconds | 0.70 |
| 36. | 2 | In Lead Frame | SR Oven | Yes/S | no | F | 240 | 30 seconds | N/A |
| 37. | 3 | In Lead Frame | SR Oven | Yes/S | no | P | 240 | 30 seconds | N/A |
| 38. | 3 | In Lead Frame | SR Oven | Yes/S | no | P | 250 | 30 seconds | 0.75 |
| 39. | 3 | In Lead Frame | SR Oven | No | Yes | F | 250 | 30 seconds | N/A |
| 40. | 4 | In Lead Frame | SR Oven | No | Yes | P | 250 | 30 seconds | 0.89 |
| 41. | 4 | In Lead Frame | SR Oven | No | Yes | P | 260 | 30 seconds | 0.84 |
| 42. | 4 | In Lead Frame | SR Oven | Yes/R | no | P | 250 | 30 seconds | 0.58 |
| 43. | 4 | In Lead Frame | SR Oven | Yes/R | no | P | 260 | 30 seconds | 0.60 |

SR = Solder ReFlow
A = Annealed
R = Rapidly Annealed
S = Slowly Annealed
U = Unannealed
R = Rapidly annealing parts @ 217° C. for 17 minutes.
S = Slowly annealing parts by ramping temperature up over a 30 minute interval, holding at 215° C. for 30 minutes, then cooling down for 30 minutes.

EXAMPLE 4

Figure 2:
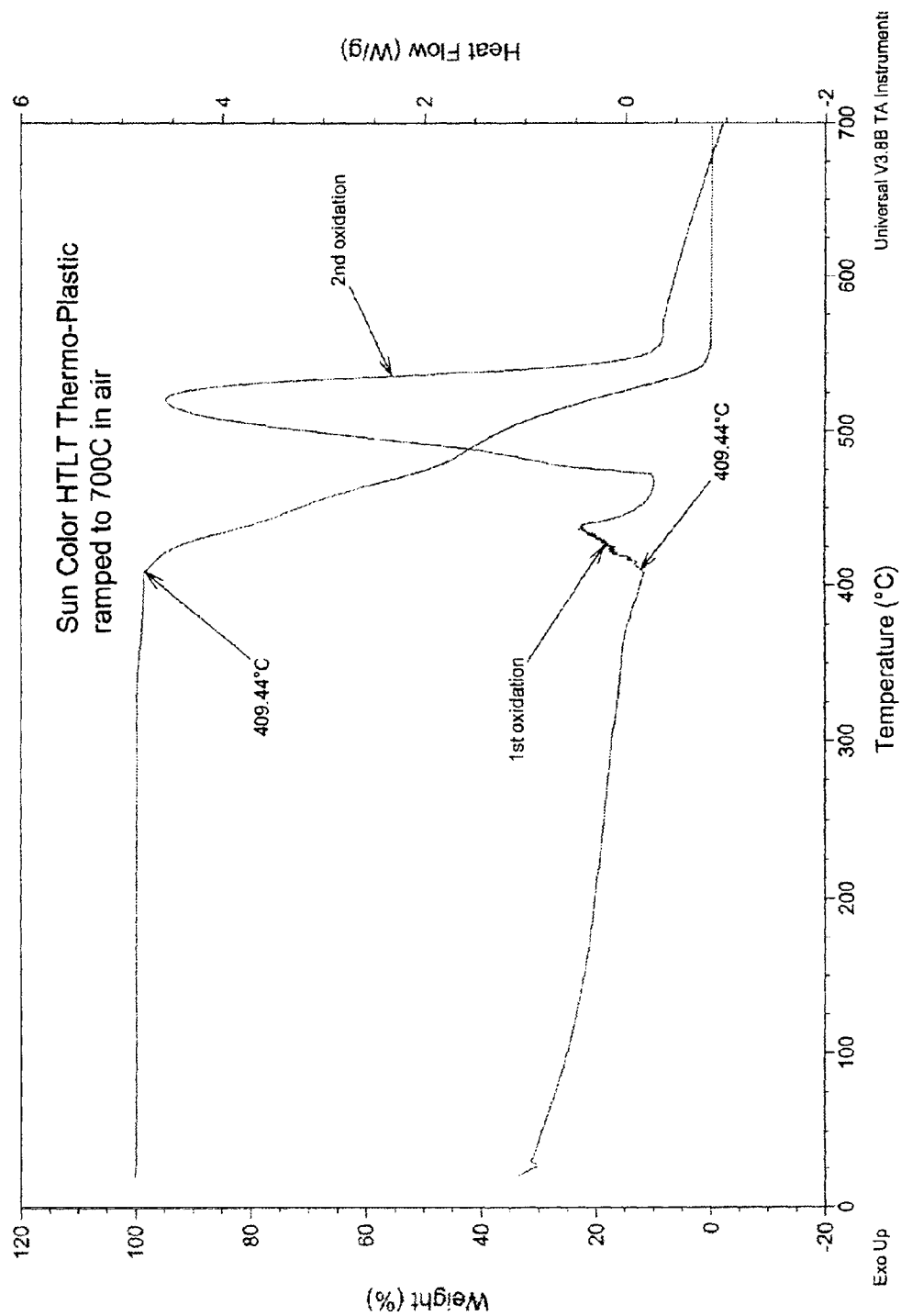
FIG. 2 is a DSC-TGA graph of a high temperature, optical thermoplastic composition in accordance with an embodiment of the invention as described in Example 4.

Polymeric composition #4 from Example 3 is solution cast with toluene solvents into a thin film of 1 mil thickness. The thermal stability of the film using DSC-TGA is shown in FIG. 2.

EXAMPLE 5

Figure 4:
FIGS. 4-6 are photographs showing the stress characteristics of un-annealed and annealed high temperature, optical thermoplastic compositions in accordance with an embodiment of the invention as described in Example 5.
Figure 5:
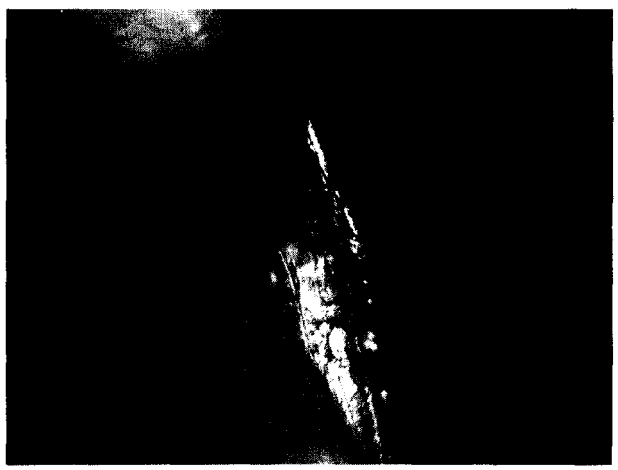
Figure 6:

Photographs showing stress characteristics of unannealed and annealed high temperature, optical thermoplastic resin compositions made from the polymeric composition of Example 1 and molded into LED lenses are shown in FIGS. 4-6. The thermal stress and flow (mold-in) stress of a lens part produced with a restricted gate is evaluated. The stresses are measured by retardance. The flow stress at the gate is measured to be about 722 nm. The retardance at the thermally stressed areas is very low, about 23-25 nanometers. The parts are then annealed with an INSTEC heater (+/−0.2° C.). The annealing profile consists of warming the parts to 210° C. for 20 minutes and then annealing the parts at 217° C. for 40 minutes. Annealing at 217° C. removes all measurable thermal stress.

The un-annealed lens parts shows a stress concentration, of thermal and primarily flow stresses, at the gate equal to about 722 nm.

After annealing the lens parts at 217° C., the thermal and flow stress at the gate is virtually eliminated, without deformation. The stress adjacent to the gate, along the base of the part, is dramatically reduced to about 210 nm, measured by retardance. (Birefringence can be calculated by dividing retardance by the thickness of the section of the part measured).

A useful annealing profile by convection oven is:
1. Warm parts to 210° C. for 20 minutes
2. Turn up heat to 217° C. and anneal for 40 minutes.
3. Cool at 20° C. per minute.

Under IR heat, a useful annealing profile is to:
1. Warm parts to 210° C. for 20 minutes, or remove from mold at 215-225° C.
2. Anneal immediately on a conveyor, under IR heat, for 3-3.5 minutes at 220° C.

While the invention has been described with reference to various embodiments, it is to be understood that various modifications may become apparent to those skilled in the art upon reading the specification. Therefore, it is to be understood that the invention includes all such modifications that may fall within the scope of the appended claims.

The invention claimed is:

1. An optically clear polymer composition suitable for making a molded article, comprising:
   at least one thermoplastic resin having a glass transition temperature of at least about 220° C.;
   inorganic particulates having an average particle size in the range up to about 100 nanometers dispersed in the at least one thermoplastic resin, the inorganic particulates having an index of refraction in the range from about 1.4 to about 3, the inorganic particulates having a zeta potential that is at least about +30 mV or more negative than −30 mV, the inorganic particulates comprising aluminum oxide, cerium oxide, titanium dioxide, zirconium dioxide, or a mixture of two or more thereof; and
   an effective amount of at least one dispersant to disperse the inorganic particulates in the at least one thermoplastic resin;
   wherein the polymer composition is thermally stable at a temperature up to about 400° C. and is made by heating pellets of the at least one thermoplastic resin at a temperature of at least about 70° C. and coating the pellets with an additive composition comprising the inorganic particulates and the dispersant; and
   wherein the molded article has a visible light transmission in the visible light range of 400 to 1000 nm of at least about 85% after surface reflective losses, and a yellowness index of less than about 3.

2. The composition of claim 1 wherein the composition further comprises at least one bluing agent, at least one ultraviolet light absorber, at least one antioxidant, or a mixture of two or more thereof.

3. The composition of claim 1 wherein the composition further comprises one or more heat stabilizers, antistatic agents, pigments, dyes, optical brighteners, flame retardants, or a mixture of two or more thereof.

4. The polymer composition of claim 1 wherein the composition further comprises at least one melt processable glass reinforcing resin.

5. The composition of claim 1 wherein the thermoplastic resin comprises polycarbonate, polysulfone, polyolefin, polystyrene, polyalkylene terephthate, or a mixture of two or more thereof.

6. The composition of claim 1 wherein the thermoplastic resin comprises polycarbonate.

7. The composition of claim 1 wherein the thermoplastic resin comprises at least one polycarbonate derived from para, para' isopropylidene diphenol, at least one polycarbonate derived from 1,1-bis-(4-hydroxyphenyl)-3,3,5-trimethylcyclohexane, a mixture thereof, or a copolymer derived from para, para' isopropylidene diphenol and 1,1-bis-(4-hydroxyphenyl)-3,3,5-trimethylcyclohexane.

8. The composition of claim 1 wherein the inorganic particulates comprise aluminum oxide and have an average particle size in the range up to about 50 nanometers and an index of refraction in the range from about 1.4 to about 3.

9. The composition of claim 1 wherein the dispersant comprises one or more fatty acids, fatty esters, fatty amides, fatty alcohols, polyalkylene glycols, polyoxyalkylene glycols, titanates, zirconates, paraffins, fluorocarbons, silicone oils, surfactants, or a mixture of two or more thereof.

10. The composition of claim 1 wherein the dispersant comprises one or more saturated fatty esters, one or more unsaturated fatty esters, or a mixture thereof.

11. The composition of claim 1 wherein the dispersant comprises a mixture of one or more fatty esters, one or more fatty acids and one or more glycerides.

12. The composition of claim 1 wherein the dispersant comprises one or more fatty amides.

13. The composition of claim 2 wherein the bluing agent comprises at least one blue dye, at least one violet dye, or a mixture thereof.

14. The composition of claim 2 wherein the ultraviolet light absorber comprises tetralkyl-2,2'-(1,4-phenylenedimethylidyne)bis malonate.

15. The composition of claim 2 wherein the antioxidant comprises at least one hindered phenol, at least one phosphite, or a mixture thereof.

16. The composition of claim 2, wherein the antioxidant comprises 1,3,5-tris(4-t-butyl-3-hydroxy-2,6-dimethylbenzyl)-s-triazine-2,4,6-(1H,3H,5H)-trione, bis(2,4-dicumylphenyl)pentaerythrithol diphosphite, or a mixture thereof.

17. The polymer composition of claim 1 wherein the polymer composition has a Tg of at least about 220° C.

18. A molded article comprising the polymer composition of claim 1.

19. The molded article of claim 18, wherein the article comprises a lens.

* * * * *